US008249487B2

(12) United States Patent
Imura et al.

(10) Patent No.: US 8,249,487 B2
(45) Date of Patent: Aug. 21, 2012

(54) ELECTRON EMITTING ELEMENT, ELECTRON EMITTING DEVICE, CHARGING DEVICE, IMAGE FORMING APPARATUS, ELECTRON-BEAM CURING DEVICE, LIGHT EMITTING DEVICE, IMAGE DISPLAY DEVICE, AIR BLOWING DEVICE, AND COOLING DEVICE

(75) Inventors: Yasuo Imura, Osaka (JP); Hiroyuki Hirakawa, Osaka (JP); Ayae Nagaoka, Osaka (JP); Tadashi Iwamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 263 days.

(21) Appl. No.: 12/781,997

(22) Filed: May 18, 2010

(65) Prior Publication Data

US 2010/0296844 A1 Nov. 25, 2010

(30) Foreign Application Priority Data

May 19, 2009 (JP) ................... 2009-121456

(51) Int. Cl.
*G03G 15/02* (2006.01)
*H01J 17/49* (2012.01)
(52) U.S. Cl. .............. 399/168; 313/495; 313/497
(58) Field of Classification Search .............. 399/51, 399/115, 118, 153, 168–173, 177, 186; 313/310, 313/311, 491–48
See application file for complete search history.

(56) References Cited

U.S. PATENT DOCUMENTS

| 4,857,161 A | 8/1989 | Borel |
| 5,891,548 A | 4/1999 | Graiver |
| 5,962,959 A | 10/1999 | Iwasaki et al. |
| 6,023,124 A | 2/2000 | Chuman et al. |
| 6,130,503 A | 10/2000 | Negishi et al. |
| 6,166,487 A | 12/2000 | Negishi et al. |
| 6,462,467 B1 | 10/2002 | Russ |
| 7,723,909 B2 * | 5/2010 | Yamaguchi et al. .......... 313/311 |

(Continued)

FOREIGN PATENT DOCUMENTS

CN 1755889 A 4/2006

(Continued)

OTHER PUBLICATIONS

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

(Continued)

*Primary Examiner* — Hoan Tran
(74) *Attorney, Agent, or Firm* — Nixon & Vanderhye, P.C.

(57) ABSTRACT

According to an electron emitting element of the present invention, an electron acceleration layer sandwiched between an electrode substrate and a thin-film electrode contains (i) insulating fine particles and (ii) at least one of (a) conductive fine particles having an average particle diameter smaller than an average particle diameter of the insulating fine particles and (b) a basic dispersant. The electron acceleration layer has a surface roughness of 0.2 μm or less in centerline average roughness (Ra). The thin-film electrode has a film thickness of 100 nm or less. As such, according to the electron emitting element of the present invention, it is possible to reduce the thickness of the thin-film electrode to an appropriate thickness. Accordingly, it is possible to increase electron emission.

24 Claims, 10 Drawing Sheets

U.S. PATENT DOCUMENTS

| | | | |
|---|---|---|---|
| 2001/0017369 | A1 | 8/2001 | Iwasaki et al. |
| 2001/0026123 | A1 | 10/2001 | Yoneda |
| 2004/0021434 | A1 | 2/2004 | Yoneda |
| 2004/0197943 | A1 | 10/2004 | Izumi |
| 2004/0246408 | A1 | 12/2004 | Ando |
| 2005/0212398 | A1 | 9/2005 | Okano et al. |
| 2006/0012278 | A1 | 1/2006 | Nanataki et al. |
| 2006/0061967 | A1 | 3/2006 | Kim et al. |
| 2006/0065895 | A1 | 3/2006 | Kusunoki et al. |
| 2006/0152138 | A1 | 7/2006 | Hori et al. |
| 2006/0186786 | A1 | 8/2006 | Iwamatsu et al. |
| 2006/0284543 | A1 | 12/2006 | Chung et al. |
| 2006/0290291 | A1 | 12/2006 | Aizawa |
| 2006/0291905 | A1 | 12/2006 | Hirakawa et al. |
| 2007/0210697 | A1 | 9/2007 | Tamura et al. |
| 2007/0222067 | A1 | 9/2007 | Nanataki et al. |
| 2010/0196050 | A1 | 8/2010 | Iwamatsu et al. |
| 2010/0215402 | A1 | 8/2010 | Nagaoka et al. |
| 2010/0278561 | A1 | 11/2010 | Kanda et al. |
| 2010/0295465 | A1 | 11/2010 | Hirakawa et al. |
| 2010/0296842 | A1 | 11/2010 | Imura et al. |
| 2010/0296843 | A1 | 11/2010 | Hirawaka et al. |
| 2010/0296845 | A1 | 11/2010 | Hirakawa |
| 2010/0307724 | A1 | 12/2010 | Ichii et al. |
| 2010/0327730 | A1 | 12/2010 | Hirakawa et al. |

FOREIGN PATENT DOCUMENTS

| | | | |
|---|---|---|---|
| CN | 1763885 | A | 4/2006 |
| CN | 1849673 | A | 10/2006 |
| EP | 1 617 449 | A2 | 1/2006 |
| EP | 1 617 450 | | 1/2006 |
| EP | 1 617 450 | A2 | 1/2006 |
| EP | 1 635 369 | | 3/2006 |
| JP | 60-20027 | A | 2/1985 |
| JP | 62-172631 | | 7/1987 |
| JP | 1-107440 | A | 4/1989 |
| JP | 1-149335 | A | 6/1989 |
| JP | 1-279557 | | 11/1989 |
| JP | 01-298623 | | 12/1989 |
| JP | 6-255168 | A | 9/1994 |
| JP | 8-97582 | A | 4/1996 |
| JP | 8-250766 | A | 9/1996 |
| JP | 9-007499 | A | 1/1997 |
| JP | 9-252068 | A | 9/1997 |
| JP | 10-121042 | | 5/1998 |
| JP | 10-308164 | A | 11/1998 |
| JP | 10-308165 | | 11/1998 |
| JP | 10-308166 | A | 11/1998 |
| JP | 11-251069 | A | 9/1999 |
| JP | 2000-76986 | A | 3/2000 |
| JP | 2000-311640 | | 11/2000 |
| JP | 2001-68012 | A | 3/2001 |
| JP | 2001-195973 | A | 7/2001 |
| JP | 2001-357961 | | 12/2001 |
| JP | 2002-93310 | A | 3/2002 |
| JP | 2002-208346 | A | 7/2002 |
| JP | 2002-279892 | A | 9/2002 |
| JP | 2003-115385 | | 4/2003 |
| JP | 2003-173744 | A | 6/2003 |
| JP | 2003-173878 | A | 6/2003 |
| JP | 2003-331712 | | 11/2003 |
| JP | 2004-241161 | | 8/2004 |
| JP | 2004-253201 | A | 9/2004 |
| JP | 2004-296781 | | 10/2004 |
| JP | 2004-296950 | | 10/2004 |
| JP | 2004-327084 | A | 11/2004 |
| JP | 2005-5205 | A | 1/2005 |
| JP | 2005-190878 | A | 7/2005 |
| JP | 2005-209396 | A | 8/2005 |
| JP | 2005-268025 | A | 9/2005 |
| JP | 2005-326080 | A | 11/2005 |
| JP | 2005-328041 | A | 11/2005 |
| JP | 2006-054162 | | 2/2006 |
| JP | 2006-100758 | A | 4/2006 |
| JP | 2006-190545 | A | 7/2006 |
| JP | 2006-236964 | | 9/2006 |
| JP | 2006-351524 | A | 12/2006 |
| JP | 2007-290873 | | 11/2007 |
| JP | 2009-019084 | A | 1/2009 |
| JP | 2009-092902 | A | 4/2009 |
| JP | 2009-146891 | A | 7/2009 |
| JP | 4314307 | B1 | 8/2009 |
| JP | 2010-267492 | A | 11/2010 |
| WO | 2005/004545 | A1 | 1/2005 |
| WO | 2009/066723 | | 5/2009 |

OTHER PUBLICATIONS

Notice of Allowance mailed Nov. 29, 2011 in U.S. Appl. No. 12/782,102.
U.S. Appl. No. 12/940,546, filed Nov. 5, 2010, entitled "Heat Exchanger".
English version of ISR for PCT/JP2009/052904 mailed Apr. 21, 2009.
ISR for PCT/JP2008/071102, mailed Feb. 24, 2009 (081423/PCT).
Electrophotography-Bases and Applications (1998; p. 213), The Society of Electrophotography of Japan, Corona Publishing Co., Ltd. (with partial English translation).
Ionic winds for locally enhanced cooling, David B. Go, Suresh V. Garimella, and Timothy S. Fisher, J. Appl. Phys., 102, 053302 (2007).
Naoi et al, "TiO2 Films Loaded with Silver Nanoparticles: Control of Multicolor Photochromic Behavior" J. Am. Chem. Soc., vol. 126, No. 11, p. 3664-3668 (2004).
Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).
U.S. Appl. No. 12/695,381, Nagaoka et al., filed Jan. 28, 2010.
U.S. Appl. No. 12/696,905, Imura et al., filed Jan. 29, 2010.
U.S. Appl. No. 12/698,342, Hirakawa et al., filed Feb. 2, 2010.
U.S. Appl. No. 12/698,435, Hirakawa et al., filed Feb. 2, 2010.
U.S. Appl. No. 12/699,349, Iwamatsu et al., filed Feb. 3, 2010.
U.S. Appl. No. 12/782,024, filed May 18, 2010, entitled "Light Emitting Element, Light Emitting Device, Image Display Device, Method of Driving Light Emitting Element, and Method of Producing Light Emitting Element".
U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".
U.S. Appl. No. 12/743,741, filed May 19, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.
Naoi et al., "TiO2 Films Loaded with Silver Nanoparticles: Control of Multicolor Photochromic Behavior", J. Am. Chem. Soc., vol. 126, No. 11, pp. 3664-3668, (2004).
Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.
Notice of Allowance mailed Dec. 29, 2011 in U.S. Appl. No. 12/782,102.
Office Action mailed Nov. 29, 2011 in U.S. Appl. No. 12/698,435.
Office Action mailed Dec. 16, 2011 in U.S. Appl. No. 12/698,435.
Office Action mailed Jun. 22, 2012 in U.S. Appl. No. 12/743,741.
Restriction Requirement mailed Apr. 16, 2012 in U.S. Appl. No. 12/699,349.
Office Action mailed Jun. 18, 2012 in U.S. Appl. No. 12/698,435.

* cited by examiner

ELECTRON EMITTING ELEMENT, ELECTRON EMITTING DEVICE, CHARGING DEVICE, IMAGE FORMING APPARATUS, ELECTRON-BEAM CURING DEVICE, LIGHT EMITTING DEVICE, IMAGE DISPLAY DEVICE, AIR BLOWING DEVICE, AND COOLING DEVICE

This Nonprovisional application claims priority under 35 U.S.C. §119(a) on Patent Application No. 2009-121456 filed in Japan on May 19, 2009, the entire contents of which are hereby incorporated by reference.

TECHNICAL FIELD

The present invention relates to an electron emitting element for emitting electrons by application of a voltage.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the element due to the intense electric field and collide with the surface. This causes a problem of breakdown of the element due to sputtering. Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the element are damaged. In order to prevent this problem, the members used around the electron emitting element are limited to members that have high resistance to ozone.

Meanwhile, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the element so that electrons are emitted from a flat surface of the element. These electron emitting elements do not require an intense electric field outside the elements, because the electrons which are accelerated in respective electron acceleration layers inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

For example, Patent Literature 1 discloses such. MIM type and MIS type electron emitting elements each including (i) an emitter section made of a dielectric material and (ii) first and second electrodes which are provided on the emitter section and to which a drive voltage is applied so that electrons are emitted from a surface of the emitter section. According to the above MIM type and MIS type electron emitting elements, the first electrode is provided on the surface of the emitter section. The emitter section has a surface roughness of not less than 0.1 (μm) but not more than 3 (μm) in centerline average roughness (Ra). This gives the emitter section a greater surface area that contributes to an electron-emitting function. Accordingly, an electrical field is likely to concentrate on an edge portion of the first electrode, thereby increasing electron emission.

CITATION LIST

Patent Literature 1

Japanese Patent Application Publication, Tokukai, No. 2006-236964 A (Publication Date: Sep. 7, 2006)

SUMMARY OF INVENTION

Technical Problem

According to the electron emitting elements of the Patent Literature 1, the emitter section (electron acceleration layer) has the surface roughness of not less than 0.1 μm but not more than 3 μm in centerline average roughness (Ra). On such a surface of the emitter section, the first electrode (thin-film electrode) is provided so that the thickness thereof is within a range of 0.1 μm to 20 μm. However, such a thickness of 0.1 μm or greater hinders the electrons from being emitted through the thin-film electrode. Accordingly, the electron emission is reduced. In order to increase the electron emission, it may be effective to reduce the thickness of the thin-film electrode. However, if the thin-film electrode is provided on the surface of the electron acceleration layer, a thickness of the thin-film electrode becomes uneven. This is because the surface of the electron acceleration layer has concave and convex portions corresponding to shapes of particles constituting the electron acceleration layer. Particularly in a case of forming the thin-film electrode by sputtering, the thin-film electrode becomes thinner in the concave portion, whereas it becomes thicker in the convex portion. This enhances surface roughness of the surface of the thin-film electrode. In a case where the thin-film electrode has a too thin thickness, the thin-film electrode cannot secure electrical conductivity. Accordingly, it is not possible to allow a sufficient electrical current to pass through the element. In addition, the element becomes weaker in strength. On the other hand, in a case where the thin-film electrode has a too thick thickness, the thin-film electrode has a difficulty of emitting the electrons therefrom. Accordingly, the electrons are absorbed into an electrode through which the electrons are emitted, or the electrons are reflected by the thin-film electrode and then recaptured in the electron acceleration layer.

That is, in a case of the electron emitting element which includes the electron acceleration layer including the particles, the thickness of the thin-film electrode needs to be optimized in consideration of the surface roughness of the electron acceleration layer. However, according to the electron emitting elements of Patent Literature 1, the thickness of the thin-film electrode is not optimized in consideration of the surface roughness of the surface of the emitter section.

The present invention has been made in view of the problems, and an object of the present invention is to provide an electron emitting element or the like, which is configured such that a thickness of a thin-film electrode is reduced to an appropriate thickness, thereby increasing electron emission.

Solution to Problem

In order to attain the object, an electron emitting element of the present invention includes: an electrode substrate; a thin-film electrode; and an electron acceleration layer sandwiched between the electrode substrate and the thin-film electrode, as a result of a voltage applied between the electrode substrate and the thin-film electrode, electrons being accelerated in the electron acceleration layer so as to be emitted from the thin-film electrode, the electron acceleration layer including (i) insulating fine particles and (ii) at least one of (a) conductive fine particles having an average particle diameter that is smaller than an average particle diameter of the insulating fine particles and (b) a basic dispersant, the electron acceleration layer having a surface roughness of 0.2 µm or less in centerline average roughness (Ra), and the thin-film electrode having a film thickness of 100 nm or less.

Advantageous Effect of Invention

According to the configuration, there is provided, between the electrode substrate and the thin-film electrode, the electron acceleration layer including (i) the insulating fine particles and (ii) at least one of (a) the conductive fine particles having the average particle diameter that is smaller than that of the insulating fine particles and (b) the basic dispersant. This electron acceleration layer is a thin-film layer made up of (i) the insulating fine particles and (ii) at least one of (a) the conductive fine particles and (b) the basic dispersant, which are densely aggregated. The electron acceleration layer has a semiconductive property. When a voltage is applied to the semiconductive electron acceleration layer, current flow occurs in the electron acceleration layer. A part of electrons in the current become ballistic electrons due to an intense electric field produced by the applied voltage and the ballistic electrons are emitted.

Here, in a case where the electron acceleration layer contains the basic dispersant, it is considered that an electron pair donor that donates a pair of electrons, included in the basic dispersant, causes electrons to be emitted from the electron emitting element. That is, the basic dispersant includes the electron pair donor that donates a pair of electrons, and the electron pair donor is ionized after donating the pair of electrons. It is considered that the ionized electron pair donor transfers electric charge on a surface of each of the insulating fine particles to which the electron pair donor is attached, thereby allowing electrical conduction on the surface of each of the insulating fine particles.

Further, according to the configuration, the electron acceleration layer has the surface roughness of 0.2 µm or less in centerline average roughness (Ra), and the thin-film electrodes has the film thickness of 100 nm or less.

In a case of forming the thin-film electrode by sputtering as described earlier, the thin-film electrode has a thin thickness in a concave portion while it has a thick thickness in a convex portion. For the thin-film electrode having a thin film thickness, the concave and convex portions of the surface are enhanced so that the convex portion is in a form of island. Accordingly, the surface of the thin-film electrode becomes no longer conductive. In order to absorb such surface roughness on the surface of the electron acceleration layer so that the surface of the thin-film electrode becomes conductive, it is necessary to increase the film thickness of the thin-film electrode. That is, the thin-film electrode needs to be thicker than an electrode to be provided on a plane surface. As is clear from the above description, the thin-film electrode needs to be thicker as the surface roughness of the electron acceleration layer becomes greater. However, the thin-film electrode having a thick film thickness allows a smaller amount of electrons to be emitted through the thin-film electrode. As such, the electron emission is reduced.

In contrast, according to the above configuration, the surface roughness of the electron acceleration layer is optimized, i.e., the surface roughness of the electron acceleration layer is 0.2 µm or less in centerline average roughness (Ra). This makes it possible to reduce the thickness of the thin-film electrode to an appropriate thickness, i.e., 100 nm or less. The thin-film electrode having a too thick film thickness indeed achieves conductivity on the surface of the element; however, it reduces an amount of the electrons being emitted through the thin-film electrode. Therefore, the film thickness of the thin-film electrode is preferably 100 nm or less.

As such, according to the electron emitting element of the present invention, it is possible to optimize the surface roughness of the electron acceleration layer, and to reduce the thickness of the thin-film electrode to the appropriate thickness. Accordingly, it is possible to increase the electron emission.

DESCRIPTION OF EMBODIMENTS

The following specifically explains Embodiments and Examples of an electron emitting element of the present invention, with reference to FIGS. 1 to 13. Note that Embodiments and Examples described below are merely specific examples of the present invention and by no means limit the present invention.

Embodiment 1

(Configuration of Element)

Figure 1:
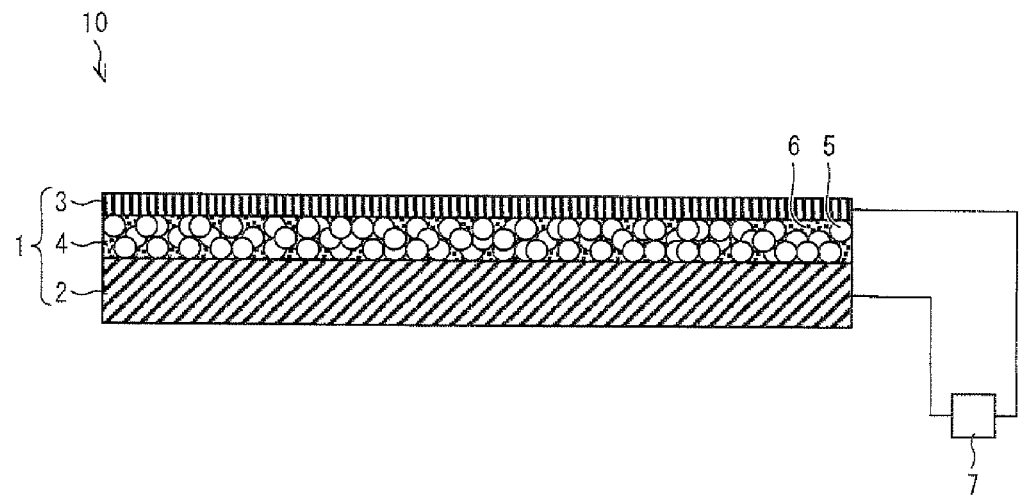
FIG. 1 is a schematic view illustrating a configuration of an electron emitting device including an electron emitting element according to an embodiment of the present invention.

FIG. 1 is a schematic view illustrating a configuration of an electron emitting device 10 including an electron emitting element 1 according to one embodiment of the present invention. As shown in FIG. 1, the electron emitting device 10 includes the electron emitting element 1 according to one embodiment of the present invention, and a power supply 7. As shown in FIG. 1, the electron emitting element 1 of the present embodiment includes: an electrode substrate 2 as a lower electrode; a thin-film electrode 3 as an upper electrode; and an electron acceleration layer 4 sandwiched therebetween. Further, the electrode substrate 2 and the thin-film electrode 3 are connected to the power supply 7, so that a voltage can be applied between the electrode substrate 2 and the thin-film electrode 3 which are provided so as to face each other. The electron emitting element 1 applies a voltage between the electrode substrate 2 and the thin-film electrode 3 so that current flows between the electrode substrate 2 and the thin-film electrode 3, that is, in the electron acceleration layer 4. A part of electrons in the current are caused to transmit through the thin-film electrode 3 and/or be emitted through holes (gaps), in the thin-film electrode 3, which are formed due to gaps between insulating fine particles, or through uneven portions between the insulating fine particles, as ballistic electrons due to an intense electric field formed by the applied voltage.

The electrode substrate 2 serving as the lower electrode also acts as a supporting member of the electron emitting element. Accordingly, the electrode substrate 2 is not specifically limited in material as long as the material has a sufficient strength, excellent adhesiveness with respect to a substance in direct contact with the material and sufficient conductivity. Examples of the electrode substrate include: metal substrates made of, for example, SUS, Ti, and Cu; semiconductor substrates made of, for example, Si, Ge, and GaAs; insulator substrates such as a glass substrate; and plastic substrates. In cases where an insulator substrate such as a glass substrate is used, a conductive material such as metal is attached, as an electrode, to an interface of the insulator substrate and the electron acceleration layer 4 so that the insulator substrate can be used as the electrode substrate 2 that serves as the lower electrode. A constituent material of the conductive material is not specifically limited as long as a thin film of a material excellent in conductivity can be formed by magnetron sputtering or the like. Note that, if a steady operation of the electron emitting element in the atmosphere is desired, a conductor having high resistance to oxidation is preferably used and noble metal is more preferably used for the constituent material. An ITO thin-film which is widely used as a conductive oxide material for a transparent electrode is also applicable. Alternatively, it is possible to use, as the lower electrode, a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 is for applying a voltage in the electron acceleration layer 4. Accordingly, a material of the thin-film electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

Further, a film thickness of the thin-film electrode is a very important factor for causing efficient emission of electrons from the electron emitting element to the outside. The thin-film electrode 3 preferably has a film thickness in a range of 10 nm to 100 nm. The minimum film thickness of the thin-film electrode 3 is 10 nm, for causing the thin-film electrode 3 to work as a planar electrode. A film thickness of less than 10 nm cannot ensure electrical conductivity. On the other hand, the maximum film thickness of the thin-film electrode 3 is 100 nm, for emitting electrons from the electron emitting element 1 to the outside. In a case where the film thickness is more than 100 nm, ballistic electrons hardly pass thorough the thin-film electrode 3. In such a case, the ballistic electrons are absorbed by the thin-film electrode 3, or the ballistic electrons are reflected back by the thin-film electrode 3 and recaptured in the electron acceleration layer 4.

Figure 2:
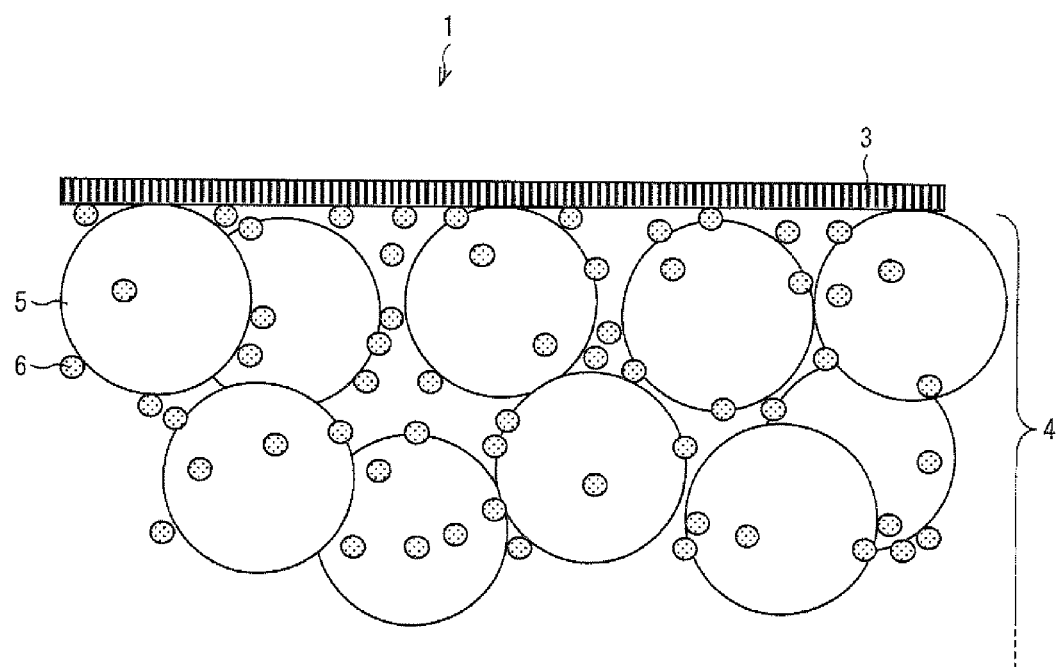
FIG. 2 is an enlarged view of the vicinity of an electron acceleration layer in the electron emitting element according to the embodiment of the present invention.
Figure 3:
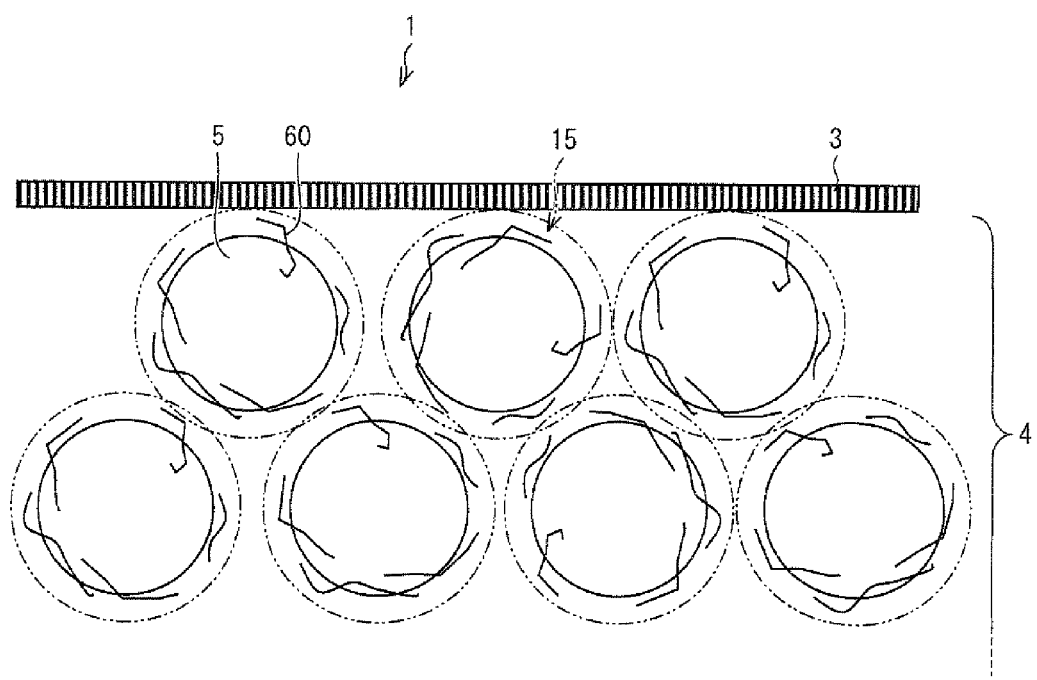
FIG. 3 is an enlarged view of the vicinity of another electron acceleration layer in the electron emitting element according to the embodiment of the present invention.

FIGS. 2 and 3 are enlarged views schematically illustrating the electron acceleration layer 4 of the electron emitting element 1 and members surrounding the electron acceleration layer 4. As illustrated in FIG. 2, the electron acceleration layer 4 includes (i) the insulating fine particles 5 and (ii) the conductive fine particles 6 which have an average particle diameter smaller than that of the insulating fine particles 5. As an alternative, as illustrated in FIG. 3, the electrode acceleration layer 4 includes (a) the insulating fine particles 5 and (b) the basic dispersant 60 that prevents the insulating fine particles 5 from aggregating in a solvent so that the insulating fine particles 5 are dispersed in the solvent. It is needless to say that the electron acceleration layer 4 may include the insulating fine particles 5, the conductive fine particles 6, and the basic dispersant 60.

A material for making the insulating fine particles 5 is not particularly limited provided that the material has an insulating property. For example, $SiO_2$, $Al_2O_3$, and $TiO_2$ are practically used. However, in a case where surface-treated silica particles having a small particle diameter are used, a surface area of the surface-treated silica particles is increased in a solvent and viscosity of the dispersion solution (solution viscosity) increases as compared to a case where spherical silica particles having a particle diameter larger than that of the surface-treated silica particles are used. As a result, a thickness of the electron acceleration layer 4 tends to increase slightly. Further, fine particles made of an organic polymer can be used as the material of the insulating fine particles 5. Examples of such fine particles that can be used are cross-linked fine particles (SX 8743) made of stylene/divinylbenzene manufactured and marketed by JSR Corporation, or Fine Sphere series which are styrene acryl fine particles manufactured and marketed by NIPPON PAINT Co., Ltd.

The insulating fine particles 5 can be made up of two or more types of particles, or can be made up of two or more types of particles having different particle diameter peaks. Alternatively, the insulating fine particles 5 can be made up of particles of one type whose particle diameter distribution is broad.

In a case where the electron acceleration layer 4 contains the conductive fine particles 6, it is preferable that the insulating fine particles 5 be contained by 80 wt % to 95 wt % with respect to a total weight of particles constituting the electrode acceleration layer 4. The insulating fine particles 5 preferably have an average particle diameter which is larger than that of the conductive fine particles 6, so as to achieve a heat discharge effect which is superior to that of the conductive fine particles 6. The average particles size of the insulating fine particles 5 is preferably within a range of 10 nm, to 1000 nm, and more preferably within a range of 10 nm to 200 nm.

The following description deals with the conductive fine particles 6, which are contained in the electron acceleration layer 4 of the electron emitting element. The conductive fine particles 6 can be made of any kind of conductor, in view of an operation principle for generating ballistic electrons. However, if the material is a conductor having high resistance to oxidation, oxidation degradation at the time of an operation under the atmospheric pressure can be prevented. In this patent application, to have high resistance to oxidation means to have a small oxide formation reaction. In general, according to a thermodynamic calculation, when a value of a change $\Delta G$ [kJ/mol] in free energy of oxide formation is negative and greater, the oxide formation reaction occurs more easily.

Examples of the conductor that has high resistance to oxidation are noble metal such as gold, silver, platinum, palladium, and nickel. The conductive fine particles 6 can be produced by using a known fine particle production method such as a sputtering method or a spray heating method. It is also possible to use commercially available metal fine particle powder such as silver nanoparticles manufactured and marketed by Applied Nano Particle Laboratory Co. A principle of generating ballistic electrons will be described later.

In the present embodiment, because control of conductivity is required, an average particle diameter of the conductive fine particles 6 has to be smaller than that of the insulating fine particles 5. The conductive fine particles 6 preferably have an average particle diameter in a range of 3 nm to 10 nm. In a case where, as described above, the average particle diameter of the conductive fine particles 6 is arranged to be smaller than that of the insulating fine particles 5 and preferably in a range of 3 nm to 10 nm, a conductive path made of the conductive fine particles 6 is not formed in the electron acceleration layer 4. As a result, dielectric breakdown becomes difficult to occur in the electron acceleration layer 4. The principle has a lot of unexplained points; however, the ballistic electrons are efficiently generated by use of the conductive fine particles 6 whose average particle diameter is within the above range.

Note that each of the conductive fine particle 6 may be surrounded by a small insulating material that is an insulating material whose size is smaller than the conductive fine particle 6. This small insulating material can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating ballistic electrons, any insulating material can be used as the small insulating material. However, in a case where the insulating material whose size is smaller than that of the conductive fine particle 6 is the insulating coating film coating the surface of the conductive fine particle 6 and an oxide film of the conductive fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

The following description discusses a principle of electron emission of the electron emitting element which includes the electron acceleration layer 4 containing the conductive fine particles 6, with reference to FIG. 2. As illustrated in FIG. 2, the electron acceleration layer 4 is made mainly of the insulating fine particles 5. Besides the insulating fine particles 5, the conductive fine particles 6 are dispersed in gaps between the insulating fine particles 5. According to the configuration of FIG. 2, the insulating fine particles 5 is contained by approximately 80 wt % with respect to a total weight of the insulating fine particles 5 and the conductive fine particles 6. In this state of the electrode acceleration layer 4, approximately six conductive fine particles 6 are attached to each of the insulating fine particles 5.

The electron acceleration layer 4 is semi-conductive because the electron acceleration layer 4 contains the insulating fine particles 5 and a small number of the conductive fine particles 6. Therefore, the electron acceleration layer 4 allows an extremely weak electrical current to pass therethrough in response to a voltage applied to the electron acceleration layer 4. A volt-ampere characteristic of the electron acceleration layer 4 shows a so-called varistor characteristic, and a current value sharply increases as an applied voltage increases. A part of electrons in the current become ballistic electrons due to an intense electric field formed within the electron acceleration layer 4 by the applied voltage. The ballistic electrons are caused to pass through (transmit) the thin-film electrode 3 and are emitted to the outside of the electron emitting element 1, or are emitted through holes (gaps) in the thin-film electrode 3 to the outside of the electron emitting element 1. A generation process of the ballistic electrons has not been determined, but it is considered that the ballistic electrons are generated by simultaneous acceleration and tunneling of electrons in a direction of an electric field.

The following description deals with the basic dispersant 60, which is contained in the electron acceleration layer 4 of the electron emitting element. In the present invention, the basic dispersant 60 has functions as follows: (i) a primary function as a dispersant that successfully disperses, in a solvent, the insulating fine particles 5 that easily cohere to one another, thereby realizing formation of a very smooth fine particle layer on a surface of the electrode substrate 2; and (ii) an additional function that allows conduction on surfaces of the insulating fine particles 5.

The basic dispersant 60 includes a polymer and an electron pair donor that is introduced into a part of the polymer. The polymer provides dispersibility due to its steric repulsion effect. In FIG. 3, a referential numeral 15 indicates a region where a steric hindrance formed between the insulating fine particles 5 is caused. The electron pair donor functions as an anchor that adsorbs to the insulating fine particle 5. Further, after donating a pair of electrons, the electron pair donor becomes a positive ion, thereby allowing ion conduction. It is presumed that the function that allows electric conduction on the surfaces of the insulating fine particles 5 is caused because a part, in the basic dispersant 60, that allows the ion conduction transfers electric charge. Further, the ion conductive parts in the basic dispersant 60 electrically repulse one another, thereby contributing to the dispersion of the insulating fine particles.

An electron pair donating part is a specific substituent having an electron donating substituent, which may be, for example, a pi electron system, such as a phenyl group or a vinyl group, an alkyl group, an amino group, or the like.

Examples of commercially available products of the basic dispersant 60 that can be applied to the present invention encompass: products manufactured by Avecia K.K. (SOLSPERSE disperses, such as SOLSPERSE 9000, 13240, 13940, 20000, 24000, 24000GR, 24000SC, 26000, 28000, 32550, 34750, 31845, and the like); products manufactured by BYK chemie (DISPERBYK 106, 112, 116, 142, 161, 162, 163, 164, 165, 166, 181, 182, 183, 184, 185, 191, 2000, 2001); products manufactured by Ajinomoto Fine-Techno Co., Inc. (AJISPER PB711, PB411, PB111, PB821, PB822); and products manufactured by EFKA chemicals (EFKA-47, 4050).

A content of the basic dispersant 60 in the electron acceleration layer 4 is an important control factor, in terms of controlling an amount of electrons emitted, because the content relates to easiness in flow of current in the electron emitting element, which is correlated with the amount of electrons emitted.

Addition of the basic dispersant 60 to the electron acceleration layer 4 is carried out in course of dispersing, in a solvent, the insulating fine particles 5 to form the electron acceleration layer 4. That is, a necessary amount of the basic dispersant 60 is added to a solvent to be used and then dispersed in the solvent, so as to prepare a dispersant-containing solvent. Subsequently, the insulating fine particles 5 are added to the dispersant-containing solvent and then sufficiently dispersed in the dispersant-containing solvent so that the basic dispersant 60 adheres to the surfaces of the insulating fine particles 5. An amount of the dispersant adhering to the surfaces of the insulating fine particles 5 can be controlled by controlling an additive amount of the dispersant added to the solvent. However, the additive amount of the dispersant is not proportional to easiness in current flow in the electron acceleration layer 4, which is obtained after the dispersant is added. That is, the easiness in current flow has a peak at a point when the additive amount of the dispersant reaches a certain amount. In a case where the additive amount is insufficient, the number of electron carriers is insufficient, thereby resulting in that an amount of current flowing in the electron acceleration layer 4 is naturally small. On the other hand, in a case where the additive amount is excessive, a component of the polymer included in the basic dispersant 60 intensely works as a resistive component with respect to the current flowing in the element, thereby reducing a current value.

As such, there is an optimal value in the additive amount of the basic dispersant 60. The optimal value is set in view of the amount of current flowing in the element, and therefore depends on the situation. However, when the content of the basic dispersant 60 is represented as an additive amount of the basic dispersant 60 with respect to an amount of a solvent of a dispersion solution containing the insulating fine particles 5, under a condition where the dispersion solution is dropped onto the electrode substrate 2 and then subjected to spin coating so as to form the insulating layer, the basic dispersant 60 is contained in the solvent preferably by 0.4 wt % to 10 wt %, and more preferably by 1 wt % to 5 wt %. In a case where the basic dispersant 60 is contained in the solvent by less than 0.4 wt %, a sufficient amount of current flowing in the electron acceleration layer cannot be obtained, thereby resulting in that the electron emitting element 1 may not emit electrons at all. In a case where the basic dispersant 60 is contained more preferably by not less than 1 wt %, it is possible to obtain stable electron emission from the electron emitting element 1. On the other hand, in a case where the basic dispersant 60 is contained by more than 10 wt %, a resistive component of the polymer included in the basic dispersant 60 may cause the current in the element to be difficult to flow. This may cause decrease in electron emission from the electron emitting element 1. In a case where the basic dispersant 60 is contained more preferably by not more than 5 wt %, it is advantageously possible to obtain electron emission from the electron emitting element 1 without any decrease in the amount of the electrons emitted.

The following description deals with a principle of the electron emission of the electron emitting element which includes the electron acceleration layer 4 containing the basic dispersant 60, with reference to FIG. 3. As illustrated in FIG. 3, the electron acceleration layer 4 is made mostly of the insulating fine particles 5, and the basic dispersant 60 adheres to the surfaces of the insulating fine particles 5. This forms a steric hindrance region 15 where a steric hindrance is caused due to the basic dispersant 60 is formed on the surfaces of the insulating fine particles 5, thereby allowing the insulating fine particles 5 to be successfully dispersed in the solvent. Further, the insulating fine particles 5 have an insulating property. However, an ion conductive part of the basic dispersant 60 adhering to the surfaces of the insulating fine particles 5 transfers electric charge, thereby resulting in that the electron acceleration layer 4 has a semi-conductive property. Therefore, the electron acceleration layer 4 allows an extremely weak electrical current to pass therethrough in response to a voltage applied between the electrode substrate 2 and the thin-film electrode 3. A volt-ampere characteristic of the electron acceleration layer 4 shows a so-called varistor characteristic, and a current value sharply increases as an applied voltage increases. A part of electrons in the current become ballistic electrons due to an intense electric field formed within the electron acceleration layer 4 by the applied voltage. The ballistic electrons are caused to pass through (transmit) the thin-film electrode 3 and are emitted to the outside of the electron emitting element 1, or are emitted through holes (gaps) in the thin-film electrode 3 to the outside of the electron emitting element 1. A generation process of the ballistic electrons has not been determined, but it is considered that the ballistic electrons are generated by simultaneous acceleration and tunneling of electrons in a direction of an electric field.

Further, (i) the insulating fine particles 5 and (ii) at least one of the conductive fine particles 6 and the basic dispersant 60 may be dispersed in a binder resin. That is, the electron acceleration layer may contain the binder resin. The binder resin may be any material, as long as the material has an insulating property and sufficient adhesiveness with respect to the electrode substrate 2 and the insulating fine particles 5 and the conductive fine particles 6 can be dispersed in the binder resin. The binder resin may be made of resin such as: tetramethoxysilane, tetraethoxysilane, methyltrimethoxysilane, methyltriethoxysilane, phenyltriethoxysilane, hexyltrimethoxysilane, decyltrimethoxysilane, hydrolysable group-containing siloxane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropyltrimethoxysilane, 3-methacryloxypropyltriethoxysilane, 3-acryloxypropyltrimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropyltrimethoxysilane, bis(triethoxysilylpropyl)tetrasulfide, and 3-isocyanatepropyltriethoxysilane. The above binder resins can be used solely or in combination of two or more kinds.

in a case where (i) the insulating fine particles 5 and (ii) at least one of the conductive fine particles 6 and the basic dispersant 60 are dispersed in the binder resin, the mechanical strength of the electron emitting element 1 increases because the binder resin has a high adhesiveness with respect to the electrode substrate 2 and has a high mechanical strength. Further, in the case where (i) the insulating fine particles 5 and (ii) at least one of the conductive fine particles 6 and the basic dispersant 60 are dispersed in the binder resin, aggregation becomes hard to occur. Accordingly, performance of the electron emitting element 1 becomes uniform, and steady electron supply becomes possible. In addition, the binder resin can improve smoothness of a surface of the electron acceleration layer 4 and makes it possible to form the thin-film electrode 3 thinly on the electron acceleration layer 4.

The thinner the electron acceleration layer 4 is, the more intense the electric field becomes. Therefore, even by a low voltage application, electrons can be accelerated in the case where the electron acceleration layer 4 is thin. However, it is preferable that the electron acceleration layer 4 have a thickness in a range of 12 nm to 6000 nm, and more preferably 300 nm to 2000 nm. This is because the thickness of the electron acceleration layer 4 in the above range makes it possible (i) to make a layer thickness of the electron acceleration layer even and (ii) to control a resistance of the electron acceleration layer 4 in a layer thickness direction.

According to the electron emitting element 1 of the present embodiment, the surface roughness of the electron acceleration layer 4 is 0.2 µm or less in centerline average roughness (Ra). The layer thickness of the thin-film electrode 3 is 100 nm or less.

The centerline average roughness is a value found by (i) sampling a reference length L from a roughness curve f(x) along a direction of a mean line of the roughness curve f(x), (ii) summing up absolute values, within the reference length L, of deviations from the mean line, and thereby (iii) calculating a mean value of the absolute values. That is, the centerline average roughness is found through the following equation (1):

$$Ra = \frac{1}{L}\int_0^L |f(x)| dx \quad (1)$$

An actual surface roughness of the electron acceleration layer 4 is able to be measured by use of a laser microscope. In the later-described examples, the actual surface roughness was measured by using VK-9500 made by KEYENCE CORPORATION, and the centerline average roughness (Ra) was found under a condition where (i) the reference length L was 5 mm and (ii) the reference length L was arbitrarily chosen from the roughness curve.

If the surface of the electron acceleration layer is uneven, the following occurs. In order to form the electrode on the surface of the electron acceleration layer so that both the convex and concave portions of the surface of the electron acceleration layer are covered with the electrode, it is necessary to form the electrode having a thicker thickness than an electrode to be formed on a flat surface. That is, the thin-film electrode needs to be thicker as the surface roughness of the electron acceleration layer becomes greater. However, the thin-film electrode having a thick film thickness allows smaller amount of electrons to be emitted through the thin-film electrode. Accordingly, electron emission is reduced.

In contrast, the surface roughness of the electron acceleration layer 4 of the electron emitting element 1 of the present embodiment is optimized, i.e., the surface roughness of the electron acceleration layer 4 is 0.2 µm or less in centerline average roughness (Ra). This makes it possible to reduce the thickness of the thin-film electrode 3 to an appropriate thickness, i.e., 100 nm or less. The thin-film electrode 3 having a too thick film thickness indeed achieves conductivity on the surface of the element; however, it reduces an amount of the electrons to be emitted through the thin-film electrode. Therefore, the film thickness of the thin-film electrode 3 is preferably 100 nm or less.

In a case of the insulating fine particles 5 having the average particle diameter falling within a range of 10 nm to 1000 nm, the most flat surface is achieved when the particles having a particle diameter of 10 nm are arranged on a flat substrate with no space between one another. Therefore, a lower limit of the Ra value is 0.9 nm. Accordingly, the electron emitting element 1 is preferably configured such that the electron acceleration layer 4 has the surface roughness of 0.9 nm or greater in centerline average roughness (Ra). Further, the thin-film electrode 3 needs to be uniformly conductive over the entire surface of the element. To this end, the thin-film electrode 3 needs to have a film thickness of at least 10 nm. Accordingly, the film thickness of the thin-film electrode 3 is preferably 10 nm or greater.

As described above, according to the electron emitting element 1 of the present embodiment, it is possible to optimize the surface roughness of the electron acceleration layer 4, and to reduce the thickness of the thin-film electrode to the appropriate thickness. Accordingly, it is possible to increase the electron emission.

(Production Method)

The following explanation deals with an embodiment of a method for producing the electron emitting element 1.

First, (i) the insulating fine particles 5 and (ii) at least one of the conductive fine particles 6 and the basic dispersant 60 are dispersed into a dispersion solvent so as to obtain a fine particle dispersion solution A. The fine particle dispersion solution A can be obtained by, for example, dispersing the insulating fine particles 5 into the dispersion solvent, and then additionally dispersing the at least one of the conductive fine particles 6 and the basic dispersant 60 into the dispersion solvent. A dispersion method is not specifically limited. For example, the dispersion can be performed by use of an ultrasonic dispersion device at a normal temperature. The dispersion solvent used here is not specifically limited as long as (i) the insulating fine particles 5 and (ii) the at least one of the conductive fine particles 6 and the basic dispersant 60 can be dispersed in the dispersion solvent, and the dispersion solvent can be dried after application of the fine particle dispersion solution A. Examples of the dispersion solvent are: toluene, benzene, xylene, hexane, and tetradecane. In a case of employing the conductive fine particles 6, a surface of each of the conductive fine particles 6 is preferably pre-treated (e.g., treated with alcoholate) so as to improve its dispersibility.

In a case where the electron acceleration layer 4 contains the conductive fine particles 6 and further contains the binder resin, the following processes are carried out. First, a dispersion solution B is obtained by dispersing the insulating fine particles 5 and the binder resin into a dispersion solvent. The dispersion solvent used here is not specifically limited as long as (i) the insulating fine particles 5 and the binder resin can be dispersed into the dispersion solvent and (ii) the dispersion solvent can be dried after application of the dispersion solution B. Examples of the dispersion solvent are: methanol, ethanol, propanol, 2-propanol, butanol, and 2-butanol. These dispersion solvents can be used solely or in combination of two or more kinds. A dispersion method is not specifically limited. For example, the dispersion can be performed by use of the ultrasonic dispersion device at a normal temperature. A content of the insulating fine particles is preferably in a range of 1 wt % to 50 wt %. In a case where the content is less than 1 wt %, the insulating fine particles do not serve as an insulator that provides an effect of controlling a resistance of the electron acceleration layer 4. Meanwhile, in a case where the content is more than 50 wt %, the aggregation of the insulating fine particles 5 occurs. The content is more preferably in a range of 1 wt % to 20 wt %, in particular.

Next, the dispersion solution B thus obtained and the conductive fine particles 6 are mixed with each other to obtain a mixed solution D. A mixing method is not particularly limited, and may be for example a mixing at a normal temperature. In a case where the conductive fine particles 6 are in a powdery state, it is preferable to obtain the dispersion solution D by mixing (i) a conductive fine particle dispersion solution C which is obtained by dispersing the conductive fine particles 6 into a dispersion solvent and (ii) the dispersion solution B. The dispersion solvent into which the conductive fine particles 6 are dispersed is not specifically limited as long as (i) dispersion of the conductive fine particles 6 is possible and (ii) the dispersion solvent can be dried after application of the dispersion solution D. Examples of the dispersion solvent are hexane and toluene.

The conductive fine particle dispersion solution C may be a liquid nano-colloidal solution of the conductive fine particles. When the liquid nano-colloidal solution of the conductive fine particles is used, it is possible to form the electron acceleration layer 4 in which the conductive fine particles 6 are uniformly dispersed. Examples of the nano-colloidal solution of the conductive fine particles are a gold nanoparticle colloidal solution fabricated and marketed by Harima Chemicals, Inc., silver nanoparticles fabricated and marketed by Applied Nano Particle Laboratory Co., a platinum nano-particle colloidal solution and a palladium nano-particle colloidal solution fabricated and marketed by Tokuriki. Chemicals Research Co., Ltd., and nickel nanoparticle paste fabricated and marketed by 10× K.K. A solvent of the nano-colloidal solution of the conductive fine particles is not specifically limited as long as (i) colloidal dispersion of the insulating fine particles 5 is possible and (ii) the solvent can be dried after application of the nano-colloidal solution. Examples of the solvent are toluene, benzene, xylene, hexane, and tetradecane.

A content of the conductive fine particles 6 is preferably within a range of 0.5 wt % to 30 wt %. If the content is less than 0.5 wt %, then the conductive fine particles 6 do not enhance an electrical current passing through the element. On the other hand, if the content is more than 30 wt %, the conductive fine particles are aggregated. It is more preferable that the content of the conductive fine particles 6 be within a range of 2 wt % to 20 wt %.

The electron acceleration layer 4 is formed by applying, to the electrode substrate 2, the above fine particle dispersion solution A or the mixed solution D, and then carrying out, for example, a spin coating method. A predetermined film thickness of the electron acceleration layer 4 is able to be achieved by repeating, a plurality of times, a film formation process and a drying process using the spin coating method. Other than the spin coating method, the electron acceleration layer 4 can be formed by, for example, a dropping method or a spray coating method. Then, the thin-film electrode 3 is formed on the electron acceleration layer 4. For forming the thin-film electrode 3, a magnetron sputtering method can be used, for example. The thin-film electrode 3 may be formed by, for example, an ink-jet method, the spin coating method, or a vapor deposition method.

EXAMPLES

The following explains an experiment in which Ra measurement and current measurement were carried out by use of electron emitting elements according to the present invention. Note that this experiment is merely an example of the present embodiment and by no means limits the present invention.

Figure 4:
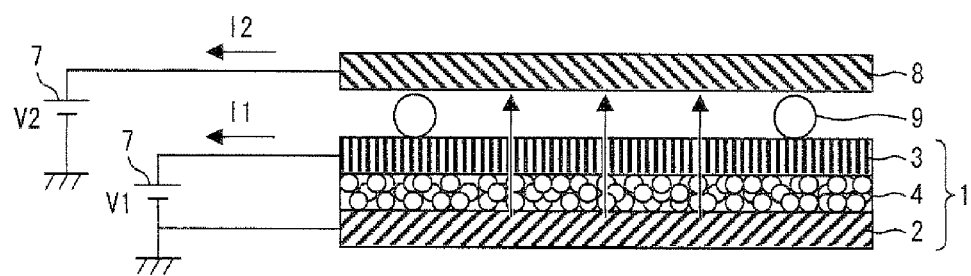
FIG. 4 is a diagram illustrating a measurement system of an electron emission experiment.

First, electron emitting elements of Examples 1 through 7 and electron emitting elements of Comparative Examples 1 through 5 were produced as described below. Next, Ra was measured for each of the electron emitting elements. Then, an electron emission current per unit area was measured for each of the electron emitting elements of Examples 1 through 7 and Comparative Examples 1 through 5, respectively, by using an experiment system as shown in FIG. 4. In the experiment system of FIG. 4, a counter electrode 8 was provided on a side of the thin-film electrode 3 of the electron emitting element 1 so that the counter electrode 8 and the thin-film electrode 3 sandwiched an insulating spacer 9. Each of the electron emitting element 1 and the counter electrode 8 was connected to a power supply 7 so that a voltage V1 was applied to the electron emitting element 1 and a voltage V2 was applied to the counter electrode 8. The above experiment system was set up in vacuum and an electron emission experiment was carried out. In the experiment, a distance via the insulating spacer 9 between the electron emitting element and the counter electrode was set to 5 mm. Moreover, an applied voltage V1 to the thin-film electrode 3 was set to 17V, and an applied voltage V2 to the counter electrode was set to 50V.

Example 1

First, (i) 3 mL of toluene solvent, serving as a dispersion solvent, and (ii) 0.5 g of spherical silica particles (average particle diameter: 50 nm), serving as insulating fine particles 5, were supplied into a 10 mL reagent bottle. The reagent bottle was stirred by using an ultrasonic dispersion device for 30 minutes so as to disperse the spherical silica particles. Next, 0.125 g of silver nanoparticles made by Applied Nano Particle Laboratory Co. (average particle diameter of silver nanoparticles: 10 nm (including 1 nm of an alcoholate insulating film which coats the silver nanoparticles)), serving as conductive fine particles 6, were additionally supplied to the reagent bottle, and then the reagent bottle was subjected to the ultrasonic dispersion process as above. In this way, a fine particle dispersion solution "a", in which the spherical silica particles and the silver nanoparticles were dispersed, was obtained. The ultrasonic dispersion process, which was carried out after the silver nanoparticles were added, was carried out for 15 minutes. In the fine particle dispersion solution "a", a content of the spherical silica particles with respect to a total weight of the spherical silica particles and the silver nanoparticles was 80 wt %.

Next, the fine particle dispersion solution "a" was deposited by spin coating on a 30 mm square SUS substrate, which serves as an electrode substrate 2, so as to obtain an electron acceleration layer 4. A surface of the electron acceleration layer 4 of Example 1 was observed under a laser microscope, and found to have Ra of 0.1 μm.

On the surface of the electron acceleration layer 4 thus obtained, a thin-film electrode was formed by using a magnetron sputtering device. As such, an electron emitting element of Example 1 was obtained. The thin-film electrode 3 was formed from gold. Further, a film thickness of the thin-film electrode 3 was 40 nm, and the surface area of the thin-film electrode 3 was 0.014 cm$^2$.

The electron emitting element of Example 1 was found to generate 0.3 mA/cm$^2$ of electron emission current under vacuum of $1\times10^{-8}$ ATM.

Example 2

An electron acceleration layer 4 was produced in a same manner as in Example 1, except that a period of the ultrasonic dispersion process after the silver nanoparticles were added was 30 minutes. A surface of the electron acceleration layer 4 of Example 2 was observed under the laser microscope, and found to have Ra of 0.2 μm.

In Example 2, a plurality of electron acceleration layers 4 were produced. Then, thin-film electrodes 3, each of which was made of gold and had the surface area of 0.014 cm$^2$, were formed on surfaces of the respective plurality of electron acceleration layers 4. The thin-film electrodes 3 thus formed had film thicknesses of 5 μm, 10 μm, 15 μm, 30 μm, 35 μm, 40 μm, and 45 μm, respectively. As such, a plurality of electron emitting elements of Example 2 were obtained.

Figure 5:
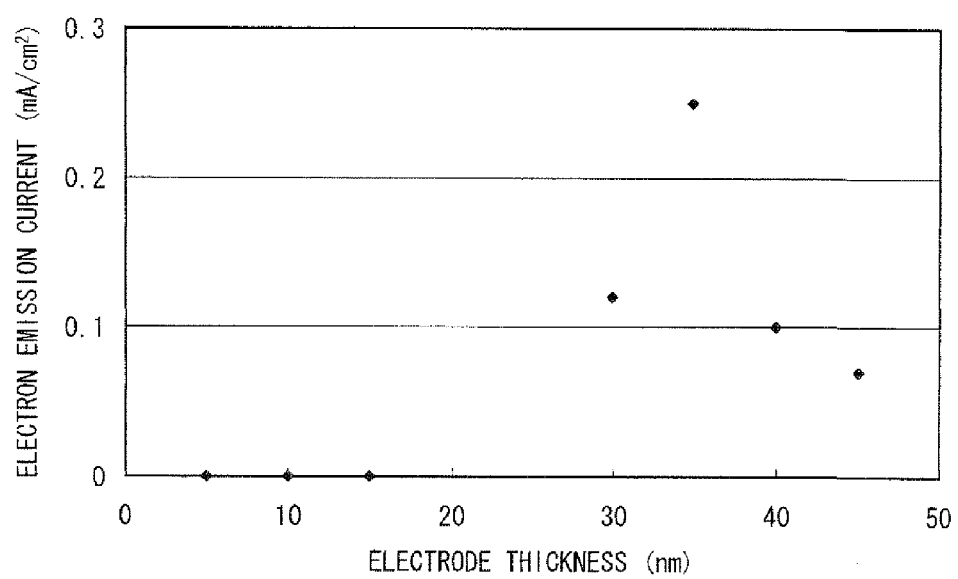
FIG. 5 is a measurement result of electron emission current, measured by changing a film thickness of a thin-film electrode.

FIG. 5 illustrates measurement results, of electron emission current per unit area, measured for each of the plurality of electron emitting elements under vacuum of $1\times10^{-8}$ ATM.

As is clear from FIG. 5, when Ra was 0.2 μm, electron emission was observed for the electron emitting elements each of which includes a thin-film electrode 3 having a film thickness of 30 nm or greater.

Example 3

First, (i) 3 mL of toluene solvent, serving as a dispersion solvent, and (ii) 0.03 g of AJISPER PB821 (made by Ajinomoto Fine-Techno Co., Inc.), serving as a basic dispersant 60, were supplied into a 10 mL reagent bottle. Then, the reagent bottle was stirred by using the ultrasonic dispersion device for 1 minute so as to disperse the basic dispersant 60. Then, 0.25 g of spherical silica particles (average particle diameter: 50 nm), serving as insulating fine particles 5, were additionally supplied to the reagent bottle, and the reagent bottle was stirred by using the ultrasonic dispersion device for 10 minutes in the same manner as above. In this way, a fine particle dispersion solution "b", in which the basic dispersant and the spherical silica particles were dispersed, was obtained.

Next, the fine particle dispersion solution "b" was deposited by spin coating on a 30 mm square SUS substrate, which serves as an electrode substrate 2, so as to obtain an electron acceleration layer 4. A surface of the electron acceleration layer 4 of Example 3 was observed under the laser microscope, and found to have Ra of 0.1 μm.

On the surface of the electron acceleration layer 4 thus obtained, a thin-film electrode was formed by using the magnetron sputtering device. As such, an electron emitting element of Example 3 was obtained. The thin-film electrode 3 was formed from gold. Further, a film thickness of the thin-film electrode 3 was 50 nm, and the surface area of the thin-film electrode 3 was 0.014 cm$^2$.

The electron emitting element of Example 3 was found to generate 0.5 mA/cm$^2$ of electron emission current under vacuum of $1\times10^{-8}$ ATM.

Example 4

First, (i) 4 mL of ethanol solvent, serving as a dispersion solvent, and (ii) 0.5 g of tetramethoxysilane (made by Shin-Etsu Chemical Co., Ltd.), serving as binder resin, were supplied into a 10 mL reagent bottle. Further, 0.5 g of spherical silica particles "AEROSIL R8200" (average particle diameter: 12 nm, made by Evonik Degussa Japan Co., Ltd.), serving as insulating fine particles 5, were supplied to the reagent bottle. The reagent bottle was stirred by using the ultrasonic dispersion device for 30 minutes. As such, a binder-containing insulating fine particle dispersion solution "c", in which the binder resin and the spherical silica particles were dispersed, was produced.

Next, the binder-containing insulating fine particle dispersion solution "c" was applied once to a 30 mm square SUS substrate, which serves as an electrode substrate 2, by spin coating. In this way, an electron acceleration layer 4 was formed. A surface of the electron acceleration layer 4 of Example 4 was observed under the laser microscope, and found to have Ra of 0.1 μm.

On the surface of the electron acceleration layer 4 thus obtained, a thin-film electrode was formed by using the magnetron spattering device. As such, an electron emitting element of Example 4 was obtained. The thin-film electrode 3 was made from gold. Further, a film thickness of the thin-film electrode 3 was 40 nm, and the surface area of the thin-film electrode 3 was 0.014 cm$^2$.

The electron emitting element of Example 4 was found to generate 0.05 mA/cm$^2$ of electron emission current under vacuum of $1\times10^{-8}$ ATM.

Example 5

First, (i) 6 mL of ethanol solvent, serving as a dispersion solvent, and (ii) 0.5 g of tetramethoxysilane (made by Shin-Etsu Chemical Co., Ltd.), serving as binder resin, were supplied into a 10 mL reagent bottle. Further, 0.5 g of spherical silica particles "AEROSIL R8200" (average particle diameter: 12 nm, made by Evonik Degussa Japan Co., Ltd.), serving as insulating fine particles 5, were supplied into the reagent bottle. Then, the reagent bottle was stirred by using the ultrasonic dispersion device for 30 minutes. As such, a binder-containing insulating fine particle dispersion solution "d", in which the binder resin and the spherical silica particles were dispersed, was produced.

Next, 1.0 g of the binder-containing insulating fine particle dispersion solution "d" was measured and supplied into another reagent bottle. Then, 1.0 g of a silver nanoparticle-containing hexane dispersion solution (made by Applied Nano Particle Laboratory Co., average particle diameter of silver fine particles: 4.5 nm, solid content of silver fine particles: 7%), serving as a dispersion solution made by dispersing the conductive fine particles 6 into a dispersion solvent, was supplied into the another reagent bottle. A mixture thus obtained was stirred at a normal temperature so as to be dispersed. In this way, a binder-containing fine particle dispersion solution "e", in which the binder resin, the spherical silica particles, and the silver nanoparticles were dispersed, was obtained.

The binder-containing fine particle dispersion solution "e" was applied once to a 30 mm square SUS substrate, which serves as an electrode substrate, by spin coating. In this way, an electron acceleration layer was formed. A surface of the electron acceleration layer was observed under the laser microscope, and found to have Ra of 0.1 μm.

On the surface of the electron acceleration layer 4 thus obtained, a thin-film electrode was formed by using the magnetron sputtering device. As such, an electron emitting element of Example 5 was obtained. The thin-film electrode was made from gold. Further, a film thickness of the thin-film electrode was 40 nm, and the surface area of the thin-film electrode 3 was 0.014 cm$^2$.

The electron emitting element of Example 5 was found to generate 0.1 mA/cm$^2$ of electron emission current under vacuum of 1×10$^{-8}$ ATM.

Example 6

An electron emitting element of Example 6 was obtained in a same manner as Example 3, except that the thickness of the thin-film electrode 3 was 100 nm. The electron emitting element generated 0.01 mA/cm$^2$ of electron emission current under vacuum of 1×10$^{-8}$ ATM.

The electron emission current was lower than that of Example 3, because the thin-film electrode is thicker than that of Example 3.

Example 7

An electron emitting element of Example 7 was obtained in a same manner as Example 4, except that the thickness of the thin-film electrode was 10 nm. The electron emitting element generated 0.006 mA/cm$^2$ of electron emission current under vacuum of 1×10$^{-8}$ ATM.

The electron emission current of Example 7 was markedly weaker than that of Example 3. This is probably because the electrode is uneven in thickness due to some surface roughness of a particle layer. That is, probably, part of the electrode barely functions as an electrode.

Comparative Example 1

An electron emitting element of Comparative Example 1 was produced in a same manner as in Example 1, except that the period of the ultrasonic dispersion process after the silver nanoparticles were added was 5 minutes. A surface of an electron acceleration layer of Comparative Example 1 was observed under the laser microscope, and found to have a lot of aggregates and to have Ra of 0.3 μm.

The electron emitting element of Comparative Example 1 did not allow electric current to pass through the electron acceleration layer under vacuum of 1×10$^{-8}$ ATM, and thus no electron emission was observed under vacuum of 1×10$^{-8}$ ATM.

Comparative Example 2

An electron emitting element of Comparative Example 2 was produced in a same manner as in Example 1, except that (i) the period of the ultrasonic dispersion process whereby to disperse the spherical silica particles was 1 minute and (ii) the period of the ultrasonic dispersion process after the silver nanoparticles were added was 5 minutes. A surface of an electron acceleration layer of Comparative Example 2 was observed under the laser microscope, and found to have a lot of aggregates and to have Ra of 0.3 μm.

The electron emitting element of Comparative Example 2 was found to generate 0.03 mA/cm$^2$ of electron emission current under vacuum of 1×10$^{-8}$ ATM.

Comparative Example 3

An electron emitting element of Comparative Example 3 was produced in a same manner as in Example 3, except that the period of the supersonic dispersion process after the spherical silica particles were added was 1 minute. A surface of an electron acceleration layer of Comparative Example 3 was observed under the laser microscope, and found to have a lot of large aggregates and to have Ra of 0.6

The electron emitting element of Comparative Example 3 did not allow electric current to pass through the electron acceleration layer under vacuum of 1×10$^{-8}$ ATM, and thus no electron emission was observed under vacuum of 1×10$^{-8}$ ATM.

Comparative Example 4

An electron emitting element of Comparative Example 4 was produced in a same manner as in Example 4, except that the period of ultrasonic dispersion process was 1 minute. A surface of an electron acceleration layer of Comparative Example 4 was observed under the laser microscope, and found to have a lot of large aggregates and to have Ra of 0.4 μm.

The electron emitting element of Comparative Example 4 did not allow electric current to pass through the electron acceleration layer under vacuum of 1×10$^{-8}$ ATM, and thus no electron emission was observed under vacuum of 1×10$^{-8}$ ATM.

Comparative Example 5

An electron emitting element of Comparative Example 5 was produced in a same manner as in Example 5, except that the period of ultrasonic dispersion process whereby to disperse the binder resin and the spherical particles was 1 minute. A surface of an electron acceleration layer of Comparative Example 5 was observed under the laser microscope, and found to have a lot of large aggregates and to have Ra of 0.4 μm.

The electron emitting element of Comparative Example 5 did not allow electric current to pass through the electron acceleration layer under vacuum of 1×10$^{-8}$ ATM, and thus no electron emission was observed under vacuum of 1×10$^{-8}$ ATM.

As is clear from the above results, in a case where the period of the ultrasonic dispersion process is short, fine particles are not sufficiently dispersed. Accordingly, surface roughness of the electron acceleration layer becomes 0.3 μm or greater in centerline average roughness (Ra). Further, it is found that, in a case where the surface roughness of the electron acceleration layer is 0.2 μm or less in centerline average roughness (Ra), the electron emitting element emits more electrons. Furthermore, it is found that, in a case where film thickness of the thin-film electrode is 100 nm or less, a preferable amount of the electrons are emitted. Moreover, it is found that the film thickness of the thin-film electrode needs to be 100 nm or greater.

Embodiment 2

Figure 6:
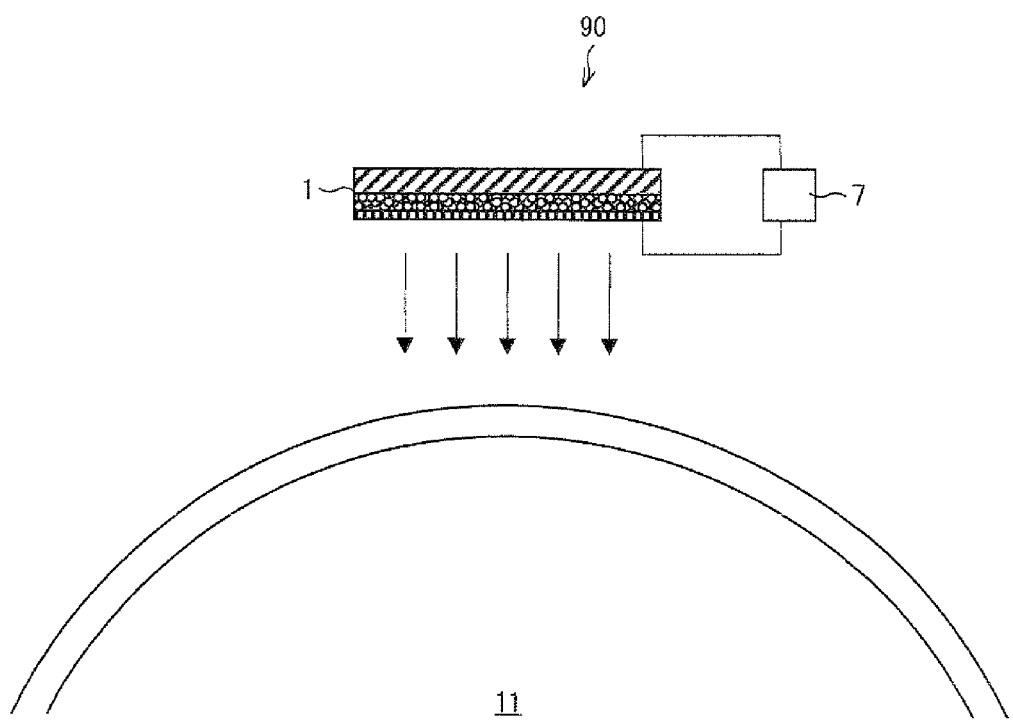
FIG. 6 is a diagram illustrating an example of a charging device including an electron emitting device of the present invention.

FIG. 6 illustrates an exemplary charging device 90 according to the present invention, which charging device 90 employs the electron emitting device 10 according to the present invention as described in Embodiment 1. The charging device 90 includes the electron emitting device 10 including the electron emitting element 1 and a power supply 7 for applying a voltage to the electron emitting element 1. The charging device 90 is used for electrically charging a photoreceptor 11. An image forming apparatus of the present invention includes the charging device 90. In the image forming apparatus of the present invention, the electron emitting element 1 constituting the charging device 90 is provided so as to face the photoreceptor 11 to be charged. Application of a voltage causes the electron emitting element 1 to emit electrons so that the photoreceptor 11 is electrically charged. In the image forming apparatus of the present invention, other than the charging device 90, known members can be used. The electron emitting element 1 constituting the charging device 90 is preferably provided so as to be, for example, 3 mm to 5 mm apart from the photoreceptor 11. Further, it is preferable that a voltage of approximately 25 V is applied to the electron emitting element 1. An electron acceleration layer of the electron emitting element 1 should be configured such that 1 $\mu A/cm^2$ of electrons are emitted per unit of time in response to application of a voltage of 25V, for example.

Since the electron emitting device 10 serving as the charging device 90 is improved in its electron emitting amount, the charging device 90 is capable of efficiently carrying out the charge.

Further, the electron emitting device 10 serving as the charging device 90 is configured as a planar electron source. Therefore, the electron emitting device 10 is capable of charging the photoreceptor 11 on an area that has a width in a rotation direction. This provides many chances for charging a section of the photoreceptor 11. Therefore, the charging device 90 can perform a more uniform electric charging as compared to a wire charging device electrically charging line by line a section on the photoreceptor 11. Further, the charging device 90 has an advantage such that the applied voltage is approximately 10 V which is far lower than that of a corona discharge device which requires an applied voltage of a few kV.

Embodiment 3

Figure 7:
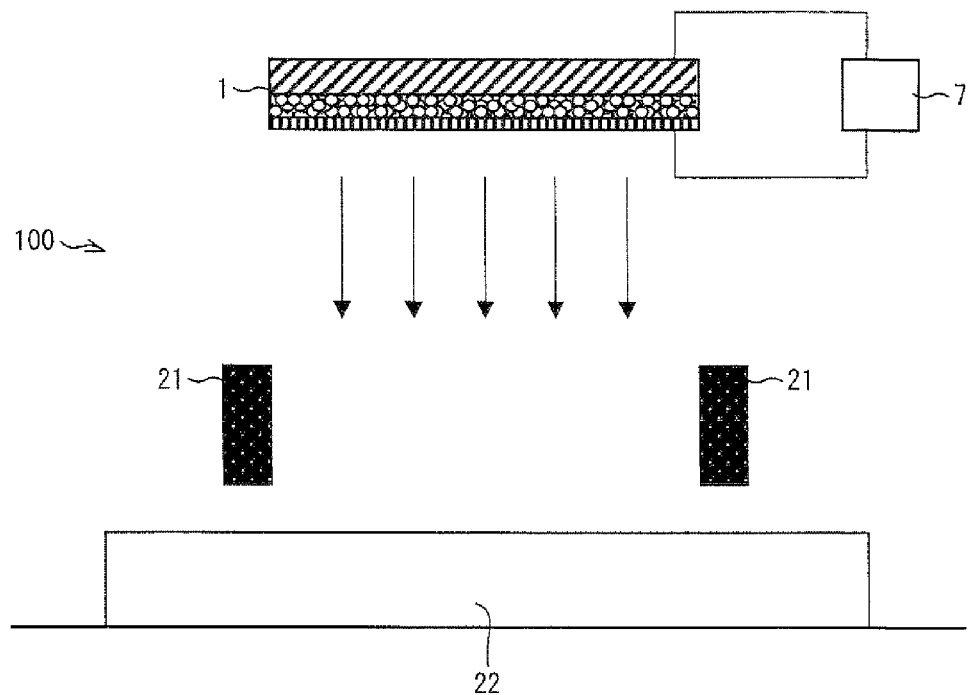
FIG. 7 is a diagram illustrating an example of an electron-beam curing device including an electron emitting device of the present invention.

FIG. 7 illustrates an exemplary electron-beam curing device 100 according to the present invention, which electron-beam curing device 100 employs the electron emitting device 10 according to the present invention as described in Embodiment 1. The electron-beam curing device 100 includes the electron emitting device 10 including the electron emitting element 1 and a power supply 7 for applying a voltage to the electron emitting element 1, and an acceleration electrode 21 for accelerating electrons. In the electron-beam curing device 100, the electron emitting element 1 serving as an electron source emits electrons, and the electrons emitted are accelerated by the acceleration electrode 21 so that the electrons collide with a resist (an object to be cured) 22. Energy necessary for curing the general resist 22 is not more than 10 eV. In terms of energy, the acceleration electrode is not necessary. However, a penetration depth of an electron beam is determined by a function of energy of electrons. For example, in order to entirely cure the resist 22 having a thickness of 1 µm, an accelerating voltage of approximately 5 kV is required.

In a conventional general electron-beam curing device, an electron source is sealed in vacuum and caused to emit electrons by application of a high voltage (in a range of 50 kV to 100 kV). The electrons are taken out through an electron window and used for irradiation. According to the above electron emission method, when the electrons pass through the electron window, loss of a large amount of energy occurs in the electrons. Further, the electrons that reach the resist pass through the resist in the thickness direction because the electrons have high energy. This decreases energy utilization efficiency. In addition, because an area on which electrons are thrown at a time is small and irradiation is performed in a manner drawing with dots, throughput is low.

In contrast, according to the electron-beam curing device 100 of the present invention employing the electron emitting device 10, it is possible to efficiently emit the electron beam because the electron emission is increased. Further, the electron-beam curing device 100 is free from energy loss because the electrons do not pass through the electron window. This allows reducing an applied voltage. Moreover, since the electron-beam curing device 100 has a planar electron source, the throughput increases significantly. In a case where electrons are emitted in accordance with a pattern, it is possible to perform a maskless exposure.

Embodiment 4

Figure 8:
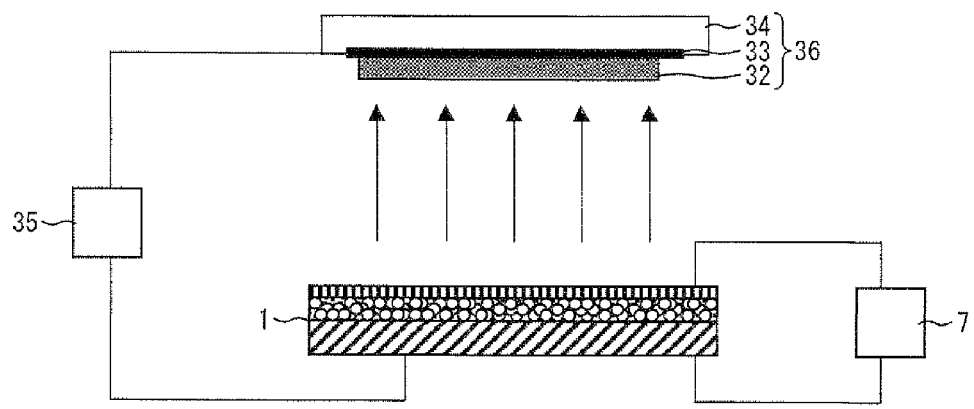
FIG. 8 is a diagram illustrating an example of a light emitting device including an electron emitting device of the present invention.
Figure 9:
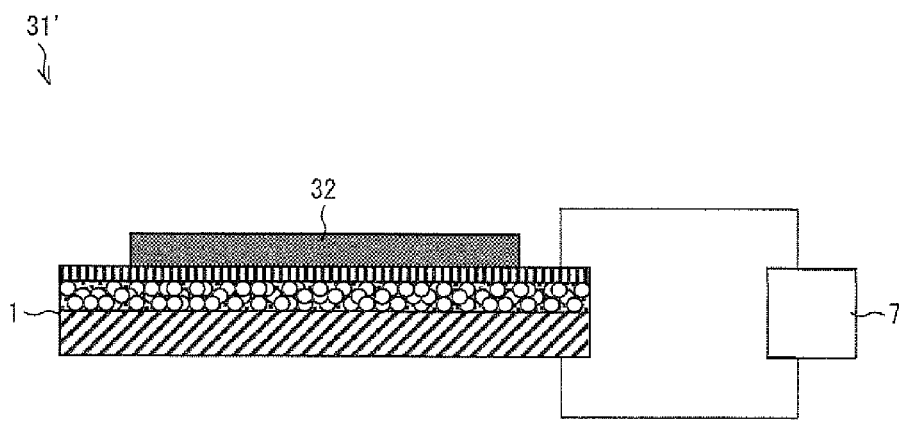
FIG. 9 is a diagram illustrating another example of a light emitting device including an electron emitting device of the present invention.
Figure 10:
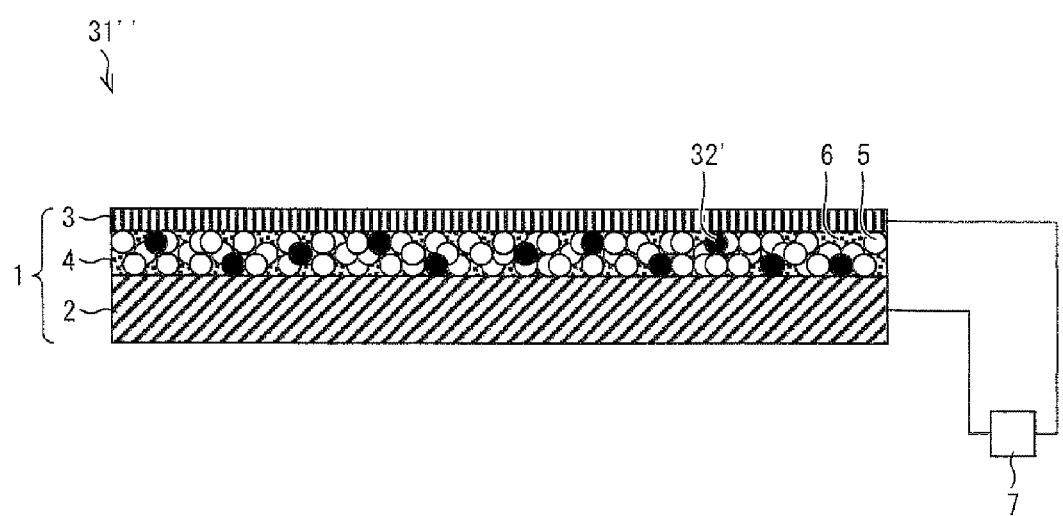
FIG. 10 is a diagram illustrating still another example of a light emitting device including an electron emitting device of the present invention.

FIGS. 8 through 10 show examples of respective light emitting devices 31, 31', and 31" of the present invention each including an electron emitting device 10 of the present invention which is described in Embodiment 1.

The light emitting device 31 illustrated in FIG. 8 includes the electron emitting device 10 including an electron emitting element 1 and a power supply 7 for applying a voltage to the electron emitting element 1, and further includes a light-emitting section 36 having a laminated structure including a glass substrate 34 as a base material, an ITO film 33, and a luminous material 32. The light emitting section 36 is provided in a position that is apart from the electron emitting element 1 so that the luminous material 32 faces the electron emitting element 1.

Suitable materials of the luminous material 32 are materials that are excited by electrons and that correspond to red light emission, green light emission, and blue light emission, respectively. Examples usable as such materials corresponding to red are $Y_2O_3$:Eu, and (Y, Gd) $Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:$Eu^{2+}$. A film of the luminous material 32 is formed on the ITO film 33 which is formed on the glass substrate 34. It is preferable that the luminous material 32 is approximately 1 µm in thickness. Further, the ITO film 33 may have any thickness as long as the ITO film 33 can reliably have conductivity at the thickness. In the present embodiment, the ITO film 33 is set to 150 nm in thickness.

For forming a film of the luminous material 32, a mixture of epoxy resin serving as a binder and luminous-material particles is prepared, and a film of the mixture may be formed by a known method such as a bar coater method or a dropping method.

In this embodiment, in order to increase a brightness of light emitted from the luminous material 32, it is necessary to accelerate, toward the luminous material, electrons which are emitted from the electron emitting element 1. Accordingly, between the electrode substrate 2 of the electron emitting element 1 and the ITO film 33 of the light-emitting section 36, a power supply 35 should be provided in order to form an electric field for accelerating the electrons. In this case, it is preferable that: (i) a distance between the luminous material 32 and the electron emitting element 1 is 0.3 mm to 1 µm; a voltage applied by the power supply 7 is 18V; and a voltage applied by the power supply 35 is 500 V to 2000 V.

A light emitting device 31' shown in FIG. 9 includes the electron emitting device 10 including an electron emitting element 1 and a power supply 7 for applying a voltage to the electron emitting element 1, and further includes a luminous material (light emitting material) 32. In the light emitting device 31', the luminous material 32 is a planar luminous material which is provided on a surface of the electron emitting element 1. In the present embodiment, a layer of the luminous material 32 is formed on a surface of the electron emitting element 1, in such a manner that a mixture of epoxy resin serving as a binder and luminous-material particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

The light emitting device 31" shown in FIG. 10 includes the electron emitting device 10 including an electron emitting element 1 and a power supply 7 for applying a voltage to the electron emitting element 1. Further, in a electron acceleration layer 4 of the electron emitting element 1, fluorescent fine particles as a luminous material (light emitting material) 32' are mixed in. In this case, the luminous material 32' may be configured to also serve as the insulating fine particles 5. Generally, however, the luminous-material fine particles have a low electric resistance. As compared to electric resistance of the insulating fine particles 5, the electric resistance of the luminous-material fine particles is clearly lower. Therefore, when the luminous-material fine particles are mixed in replacement of the insulating fine particles 5, an amount of the luminous-material fine particles should be suppressed to a small amount. For example, when spherical silica particles (average particle diameter of 110 nm) is used as the insulating fine particles 5 and ZnS:Mg (average particle diameter of 500 nm) are used as the luminous-material fine particles, an appropriate mixture ratio by weight of the insulating fine particles 5 and the luminous-material fine particles is approximately 3:1.

In the above light emitting devices 31, 31', and 31", electrons emitted from the electron emitting device are caused to collide with the corresponding fluorescent bodies 32 and 32' so that light is emitted.

Since the electron emitting element 1 emits increased amount of electrons, the light emitting devices 31, 31', and 31" are capable of efficiently emitting light. Note that, sealed in vacuum, the light emitting devices 31, 31', and 31" can work more efficiently because an electron emission current increases.

Figure 11:
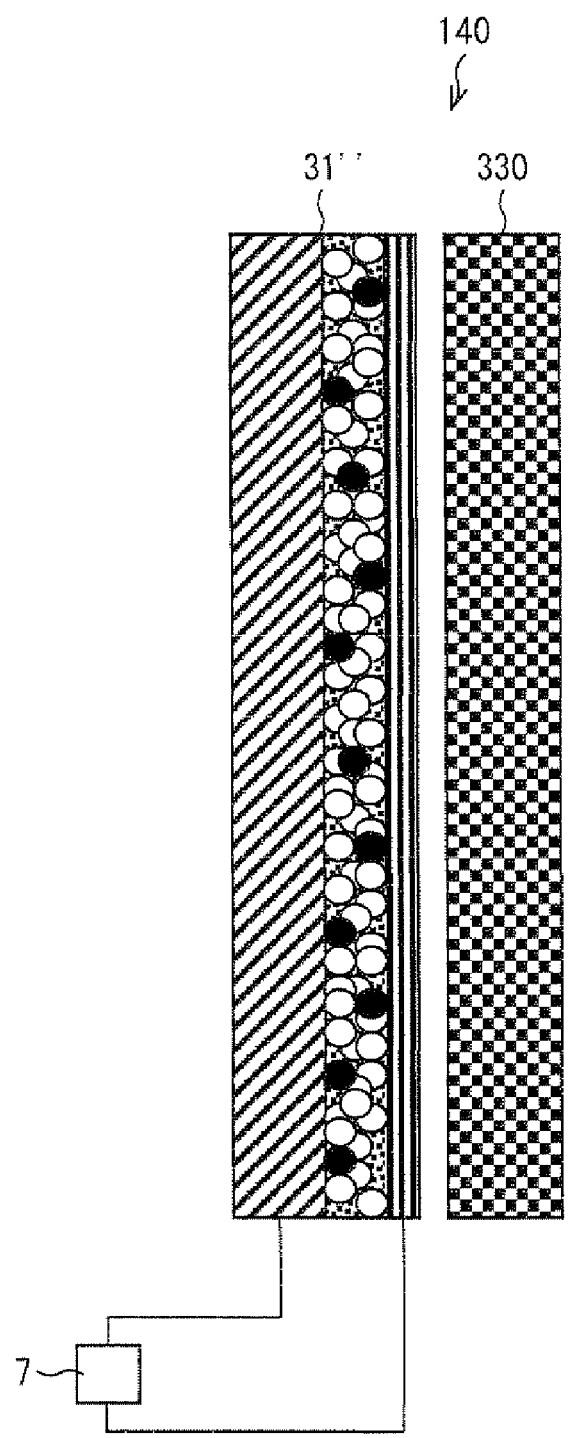
FIG. 11 is a diagram illustrating an example of an image display device having a light emitting device including an electron emitting device of the present invention.

FIG. 11 illustrates an example of an image display device of the present invention which includes a light emitting device of the present invention. An image display device 140 illustrated in FIG. 11 includes a light emitting device 31" illustrated in FIG. 9, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be configured to emit, for example, 10 $\mu A/cm^2$ of electrons per unit of time at the preferable voltage of 20 V to 35 V. Further, it is preferable that a distance between the light emitting device 31" and the liquid crystal panel 330 is approximately 0.1 mm.

In cases where light emitting devices 31 illustrated in FIG. 8 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 $\mu A/cm^2$ of electrons per unit of time, at the applied voltage in the range of 20 V to 35 V.

Embodiment 5

Figure 12:
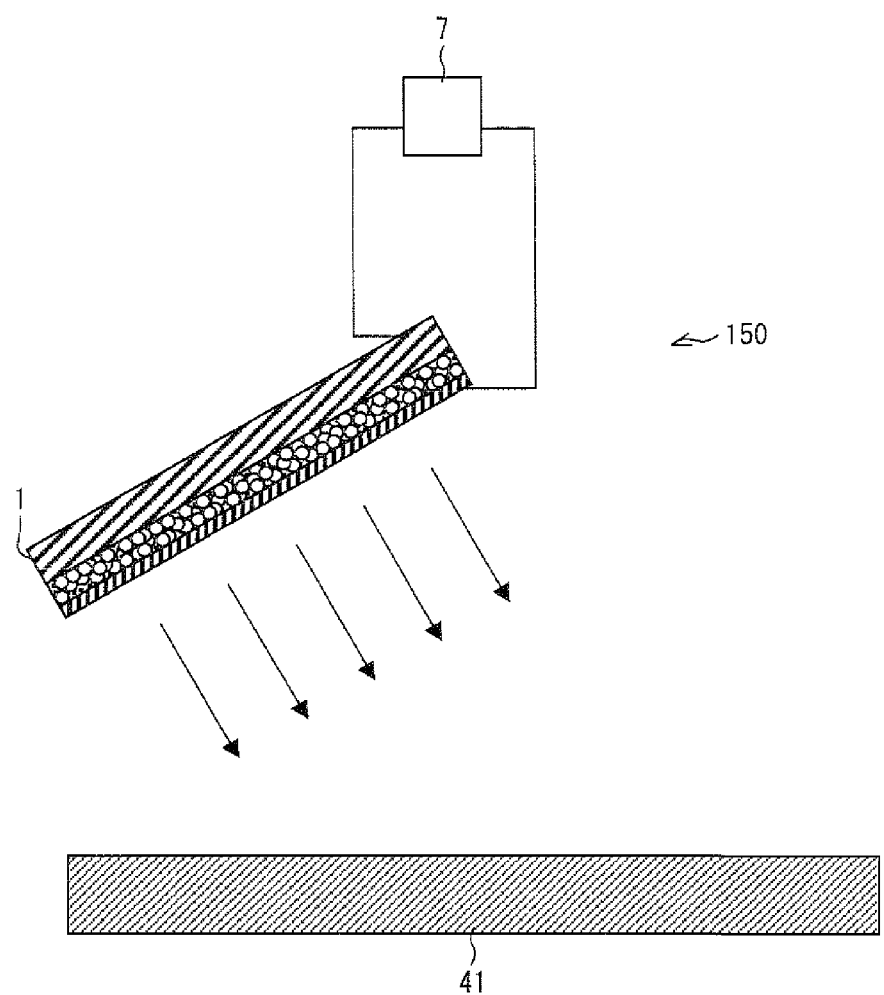
FIG. 12 is a diagram illustrating an example of an air blowing device including an electron emitting device of the present invention and a cooling device which includes the air blowing device.
Figure 13:
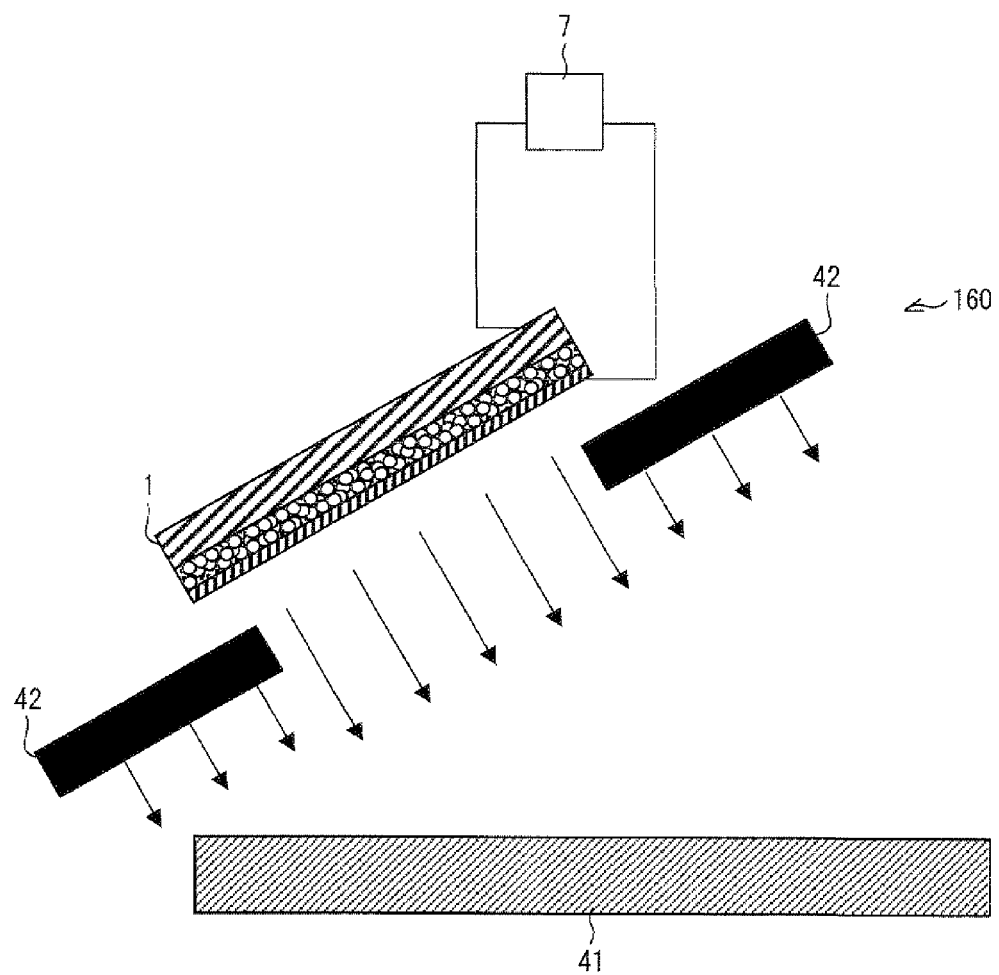
FIG. 13 is a diagram illustrating another example of an air blowing device including an electron emitting device of the present invention and a cooling device which includes the air blowing device.

FIG. 12 and FIG. 13 show examples of air blowing devices 150 and 160 of the present invention each including an electron emitting device 10 of the present invention described in Embodiment 1. The following explanation deals with a case where each of the air blowing devices of the present invention is used as a cooling device. However, application of the air blowing device is not limited to a cooling device.

The air blowing device 150 illustrated in FIG. 12 includes the electron emitting device 10 including the electron emitting element 1 and a power supply 7 for applying a voltage to the electron emitting element 1. In the air blowing device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 $\mu A/cm^2$ of electrons per unit of time in the atmosphere.

In addition to the arrangement of the air blowing device 150 illustrated in FIG. 12, an air blowing device 160 illustrated in FIG. 13 further includes a blowing fan 42. In the air blowing device 160 illustrated in FIG. 13, an electron emitting device 10 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional air blowing device or a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent to the object 41, the air sent to the object 41 is attracted to the surface of the object 41 by electric force in the vicinity of the object 41. This makes it possible to replace the air in the vicinity of the surface of the object 41. In the present embodiment, because the air blowing devices 150 and 160 of the present invention blow air including electrically charged particles such as electrons or ions, the cooling efficiency is significantly improved. Further, since the electron emitting element 1 emits an increased amount of electrons, it is possible to more efficiently cool the blowing devices 150 and 160.

Configuration of Present Invention

An electron emitting element of the present invention includes, as described above, an electrode substrate; a thin-film electrode; and an electron acceleration layer sandwiched between the electrode substrate and the thin-film electrode, as a result of a voltage applied between the electrode substrate and the thin-film electrode, electrons being accelerated in the electron acceleration layer so as to be emitted from the thin-film electrode, the electron acceleration layer including (i) insulating fine particles and (ii) at least one of (a) conductive fine particles having an average particle diameter that is smaller than an average particle diameter of the insulating fine particles and (b) a basic dispersant, the electron acceleration layer having a surface roughness of 0.2 μm or less in centerline average roughness (Ra), and the thin-film electrode having a film thickness of 100 nm or less.

According to the above configuration, it is possible to optimize the surface roughness of the electron acceleration layer, and to reduce the thickness of the thin-film electrode to an appropriate thickness. As such, it is possible to increase the electron emission.

In addition, the electron emitting element of the present invention is preferably configured such that, besides the above configuration, the insulating fine particles have the average particle diameter that falls within a range of 10 nm to 1000 nm, and more preferably within a range of 10 nm to 200 nm. A particle diameter distribution of the insulating fine particles may be broad with respect to the average particle diameter. For example, fine particles whose average particle diameter is 50 nm may have a particle diameter distribution extending from 20 nm to 100 nm. If the particle diameter of the insulating fine particles is too small, then the insulating fine particles are difficult to be dispersed because force between the particles is strong and thus the particles are likely to aggregate. On the other hand, if the particle diameter of the insulating fine particles is too large, then the insulating fine particles are well dispersed. However, in this case, it is difficult to adjust (i) the film thickness of the electron acceleration layer so as to adjust resistance and (ii) a mixing rate of at least one of the conductive fine particles and the basic dispersant.

In a case of the insulating fine particles having the average particle diameter falling within a range of 10 nm to 1000 nm, the most flat surface is achieved when the particles having a particle diameter of 10 nm are arranged on a flat substrate with no space between one another. Therefore, a lower limit of the Ra value is 0.9 nm. Accordingly, the electron emitting element of the present invention is preferably configured such that, besides the above configuration, the electron acceleration layer has the surface roughness of 0.9 nm or greater in centerline average roughness (Ra). Further, the thin-film electrode needs to be uniformly conductive over the entire surface of the element. To this end, the thin-film electrode needs to have a film thickness of at least 10 nm. Accordingly, the film thickness of the thin-film electrode is preferably 10 nm or greater.

The electron emitting element of the present invention is preferably configured such that, besides the above configuration, the electron acceleration layer has a film thickness that falls within a range of 12 nm to 6000 nm, and more preferably within a range of 300 nm to 2000 nm. In a case where the film thickness is thick, the aggregate of the fine particles is sunk in the electron acceleration layer so that the surface roughness of the electron acceleration layer is reduced. Accordingly, it is possible to reduce the thickness of the thin-film electrode. However, in such a case, the electron acceleration layer has higher resistance, and thus the electron acceleration layer allows little electrical current to pass therethrough. As such, the electron emission is reduced. On the other hand, in a case where the electron acceleration layer is thin, the aggregate of the fine particles, although the aggregate is small in size, contributes to the surface roughness of the electron acceleration layer. Accordingly, the thickness of the thin-film electrode needs to be increased. Therefore, the thickness of the electron acceleration layer is preferably within the above range. Further, the electron acceleration layer having the film thickness falling within the above range makes it possible to achieve a uniform film thickness, and to adjust the resistance, in a film thickness direction, of the electron acceleration layer. Accordingly, it is possible to emit the electrons uniformly from the entire surface of the electron emitting element. Thus, the electrons are efficiently emitted toward outside.

The electron emitting element of the present invention can be configured such that, besides the above configuration, the electron acceleration layer contains binder resin.

According to the above configuration, the electron acceleration layer contains the binder resin. Therefore, in a case where the electron acceleration layer contains the conductive fine particles, the binder resin surrounds the conductive fine particles. This makes element degradation due to oxidation caused by oxygen in the atmosphere difficult to occur. Therefore, the electron emitting element can be steadily operated not only in vacuum but also under the atmospheric pressure. Further, since (i) the insulating fine particles and (ii) the at least one of the conductive fine particles and the basic dispersant are dispersed in the binder resin, aggregation is less likely to occur. Accordingly, performance of the electron emitting element becomes uniform, and steady electron supply becomes possible. Furthermore, the binder resin has a high adhesiveness with respect to the electrode substrate and a high mechanical strength. In addition, the binder resin improves smoothness of a surface of the electron acceleration layer, so that the thin-film electrode on the electron acceleration layer can be formed thinly.

The electron emitting element of the present invention can be configured such that, besides the above configuration, the insulating fine particles contain at least one of $SiO_2$, $Al_2O_3$, and $TiO_2$. Alternatively, the insulating fine particles can contain an organic polymer. In a case where the insulating fine particles contain (i) at least one of $SiO_2$, $Al_2O_3$, and $TiO_2$ or (ii) the organic polymer, it is possible to adjust the resistance of the electric acceleration layer so that the resistance falls within an intended range. This is because each of $SiO_2$, $Al_2O_3$, $TiO_2$ and the organic polymer has a high insulating property.

The electron emitting element of the present invention can be configured such that, besides the above configuration, the thin-film electrode contains at least one of gold, silver, carbon, tungsten, titanium, aluminum, and palladium. Because the thin-film electrode contains at least one of gold, silver, carbon, tungsten, titanium, aluminum, and palladium, tunneling of electrons generated by the electron acceleration layer becomes more efficient because of a low work function of the above substances. As a result, it becomes possible to emit more electrons having high energy to the outside of the electron emitting element.

The electron emitting element can be configured such that the electron acceleration layer contains (i) the insulating fine particles and (ii) at least the conductive fine particles, and the conductive fine particles are made of a conductor having high resistance to oxidation. To have a high resistance to oxidation here means to have a small oxide formation reaction. In general, according to a thermodynamic calculation, when a value of a change $\Delta G$ [kJ/mol] in free energy of oxide formation is negative and greater, the oxide formation reaction occurs more easily In the present invention, a metal element whose $\Delta G$ is equal to or greater than −450 [kJ/mol] is considered to be the conductive fine particles having a high resistance to oxidation. Further, the conductive fine particles having a high resistance to oxidation also include conductive fine particles whose oxide formation reaction is made difficult to occur by attaching, on the conductive fine particles, an insulating material whose particle diameter is smaller than that of the conductive fine particles or by coating the conductive fine particles with use of such an insulating material.

According to the arrangement, because a conductor having a high resistance to oxidation is used as the conductive fine particles, element degradation due to oxidation caused by oxygen in the atmosphere becomes hard to occur. Therefore, the electron emitting element can be more steadily operated even under the atmospheric pressure. Therefore, a life of the electron emitting element can be extended and the electron emitting element can be operated continuously for a long time even in the atmosphere.

The electron emitting element of the present invention can be configured such that, besides the above configuration, the conductive fine particles are made of a noble metal. Because the conductive fine particles are made of a noble metal as described above, it becomes possible to prevent element degradation such as oxidation caused by oxygen in the atmosphere. This makes it possible to extend a life of the electron emitting element.

The electron emitting element of the present invention can be configured such that, besides the above configuration, the conductor constituting the conductive fine particles contains at least one of gold, silver, platinum, palladium, and nickel. Because the conductor that the conductive fine particles are made of contains at least one of gold, silver, platinum, palladium, and nickel, it becomes possible to more effectively prevent element degradation such as oxidation of the conductive fine particles caused by oxygen in the atmosphere. This makes it possible to extend a life of the electron emitting element.

In the electron emitting element of the present invention, because control of electric conductivity is required, an average particle diameter of the conductive fine particles should be smaller than that of the insulating fine particles, and preferably in a range of 3 nm to 10 nm. In a case where an average particle diameter of the conductive fine particles is arranged to be smaller than that of the insulating fine particles and preferably in a range of 3 nm to 10 nm, the following effect is obtained. That is, a conductive path is not formed in the electron acceleration layer by the conductive fine particles. As a result, dielectric breakdown becomes difficult to occur in the electron acceleration layer. There are a lot of unexplained points in terms of a principle. However, the ballistic electrons are efficiently generated by use of the conductive fine particles whose average particle diameter is within the above range.

The electron emitting element of the present invention can be configured such that, besides the above configuration, the conductive fine particles are surrounded by a small insulating material which is smaller than each of the conductive fine particles. The presence of the small insulating material around the conductive fine particles contributes to improvement of dispersibility of the conductive fine particles in a dispersion solution at the time when the element is produced. In addition, due to the presence, element degradation such as oxidation of the conductive fine particles caused by oxygen in the atmosphere can be more effectively prevented. This makes it possible to effectively extend a life of the electron emitting element.

The electron emitting element of the present invention can be configured such that, besides the above configuration, the small insulating material contains at least one of alcoholate, aliphatic acid, and alkanethiol. It contributes to improvement of dispersibility of the conductive fine particles in the dispersion solution at the time when the element is produced that the small insulating material contains at least one of alcoholate, aliphatic acid, and alkanethiol as described above. As a result, abnormal current path formation caused by an aggregate of the electrically conductive fine particles becomes difficult to occur. In addition, because the above case prevents a change in composition of particles due to oxidation of the conductive fine particles themselves that are present around the insulating material, no influence on electron emission characteristics occurs. Therefore, a life of the electron emitting element can be effectively extended.

In the electron emitting element of the present invention, the small insulating material is present as an adhering substance and adheres to respective surfaces of the conductive fine particles. This adhering substance may coat respective surfaces of the electrically conductive fine particles, as an aggregate of the particles each having a smaller average particle diameter than the average particle diameter of the conductive fine particles. In this way, the small insulating material adheres to the respective surfaces of the electrically conductive fine particles or coats, as an aggregate of the particles each having an average particle diameter smaller than the average particle diameter of the conductive fine particles, the respective surfaces of the conductive fine particles. This presence of the small insulating material contributes to improvement in dispersibility of the conductive fine particles in the dispersion solution at the time when the element is produced. Accordingly, abnormal current path formation caused by an aggregate of the conductive fine particles becomes difficult to occur. In addition, because the above case prevents a change in composition of particles due to oxidation of the conductive fine particles themselves that are present around the insulating material, no influence on electron emission characteristics occurs. Therefore, a life of the electron emitting element can be more effectively extended.

The electron emitting element of the present invention can be configured such that, besides the above configuration, the electron acceleration layer contains (i) the insulating fine particles and (ii) at least the basic dispersant, and the basic dispersant includes a polymeric material that disperses the insulating fine particles due to its steric repulsion effect, into which polymeric material an electron pair donor that donates a pair of electrons is introduced as a substituent.

Since the basic dispersant contains the polymeric material that disperses the insulating fine particles due to its steric repulsion effect, it is possible to achieve good dispersibility of the insulating fine particles. Further, it is possible to achieve a uniform dispersibility of a fine particle layer, which serves as the electron acceleration layer. As such, it is possible to reduce a process variation in the electron emitting element.

An element emitting device of the present invention includes: any one of the above electron emitting elements; and a power supply section for applying the voltage between the electrode substrate and the thin-film electrode.

According to the above configuration, it is possible to (i) secure electrical conductivity, (ii) allow a sufficient amount of electrical current to pass through the element, and (iii) increase electron emission from the thin-film electrode.

Further, (i) a light emitting device including the electron emitting device of the present invention and (ii) an image display device including the light emitting device are capable of increasing the electron emission. Accordingly, it is possible to achieve a high-efficient light emission. In addition, it is possible to provide a light emitting device which achieves stable and long-life plane light emission. Furthermore, (i) an air blowing device including the electron emitting device of the present invention and (ii) a cooling device including the electron emitting device of the present invention are capable of increasing the electron emission. Accordingly high-efficient cooling can be achieved. Moreover, (i) a charging device including the electron emitting device of the present invention and (ii) an image forming apparatus including the charging device are capable of increasing the electron emission. Accordingly, high-efficient charging can be achieved. Moreover, an electron-beam curing device including the electron emitting device of the present invention is capable of increasing the electron emission. Thus, efficient irradiation of electron beam can be achieved. In addition, Further, it becomes possible to perform electron-beam curing area by area. This makes it possible to allow a maskless process, thereby achieving low cost and high throughput.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, it is needless to say that a numeric value outside the range described in the Specification is also encompassed in the present invention provided the numeric value is within a rational range which is not against the gist of the present invention.

INDUSTRIAL APPLICABILITY

According to an electron emitting element of the present invention, it is possible to reduce a thickness of a thin-film electrode to an appropriate thickness. Accordingly, it is possible to increase electron emission. Therefore, the present invention can be suitably applied, for example, (i) to a charging device of image forming apparatuses such as an electrophotographic copying machine, a printer, and a facsimile; (ii) an electron-beam curing device; (iii) in combination with a luminous material, to an image display device; or (iv) by utilizing ion wind generated by electrons emitted from the electron emitting element, to a cooling device.

REFERENCE SIGNS LIST

1 Electron Emitting Element
2 Electrode Substrate
3 Thin-Film Electrode
4 Electron Acceleration Layer
5 Insulating Fine Particles
6 Conductive Fine Particles
7 Power Supply (Power Supply Section)
8 Counter Electrode
9 Insulating Spacer
10 Electron Emitting Device
11 Photoreceptor
15 Steric Hindrance Region
21 Acceleration Electrode
22 Resist (Object to be Cured)
31, 31', 31" Light Emitting Device
32, 32' Luminous Material (Light Emitting Material)
33 ITO Film
34 Glass Substrate
35 Power Supply
36 Light Emitting Section
41 Object to be Cooled
42 Air Blowing Fan
60 Basic Dispersant
90 Charging Device
100 Electron-Beam Curing Device
140 Image Display Device
150 Air Blowing Device
160 Air Blowing Device
330 Liquid Crystal Panel

The invention claimed is:

1. An electron emitting element, comprising:
    an electrode substrate;
    a thin-film electrode; and
    an electron acceleration layer sandwiched between the electrode substrate and the thin-film electrode,
    as a result of a voltage applied between the electrode substrate and the thin-film electrode, electrons being accelerated in the electron acceleration layer so as to be emitted from the thin-film electrode,
    the electron acceleration layer including (i) insulating fine particles and (ii) at least one of (a) conductive fine particles having an average particle diameter that is smaller than an average particle diameter of the insulating fine particles and (b) a basic dispersant,
    the electron acceleration layer having a surface roughness of 0.2 μm or less in centerline average roughness (Ra), and
    the thin-film electrode having a film thickness of 100 nm or less.

2. The electron emitting element according to claim 1, wherein the insulating fine particles have the average particle diameter that falls within a range of 10 nm to 1000 nm.

3. The electron emitting element according to claim 2, wherein the insulating fine particles have the average particle diameter that falls within a range of 10 nm to 200 nm.

4. The electron emitting element according to claim 1, wherein:
    the electron acceleration layer has the surface roughness of 0.9 nm or greater in centerline average roughness (Ra), and
    the thin-film electrode has a film thickness of 10 nm or greater.

5. The electron emitting element according to claim 1, wherein the electron acceleration layer has a film thickness that falls within a range of 12 nm to 6000 nm.

6. The electron emitting element according to claim 5, wherein the electron acceleration layer has the film thickness that falls within a range of 300 nm to 2000 nm.

7. The electron emitting element according to claim 1, wherein the electron acceleration layer contains binder resin.

8. The electron emitting element according to claim 1, wherein the insulating fine particles contain at least one of $SiO_2$, $Al_2O_3$, $TiO_2$, or an organic polymer.

9. The electron emitting element according to claim 1, wherein the thin-film electrode contains at least one of gold, silver, carbon, tungsten, titanium, aluminum, and palladium.

10. The electron emitting element according to claim 1, wherein:
    the electron acceleration layer contains (i) the insulating fine particles and (ii) at least the conductive fine particles, and
    the conductive fine particles are made of a conductor having high resistance to oxidation.

11. The electron emitting element according to claim 10, wherein the conductive fine particles are made of a noble metal.

12. The electron emitting element according to claim 10, wherein:
    the conductor constituting the conductive fine particles contains at least one of gold, silver, platinum, palladium, and nickel.

13. The electron emitting element according to claim 10, wherein the conductive fine particles have an average particle diameter that falls within a range of 3 nm to 10 nm.

14. The electron emitting element according to claim 10, wherein the conductive fine particles are surrounded by a small insulating material which is smaller than each of the conductive fine particles.

15. The electron emitting element according to claim 14, wherein the small insulating material contains at least one of alcoholate, aliphatic acid, and alkanethiol.

16. The electron emitting element according to claim 1, wherein:
- the electron acceleration layer contains (i) the insulating fine particles and (ii) at least the basic dispersant, and
- the basic dispersant includes a polymeric material that disperses the insulating fine particles due to its steric repulsion effect, into which polymeric material an electron pair donor that donates a pair of electrons is introduced as a substituent.

17. An electron emitting device, comprising:
an electron emitting element as set forth in claim 1; and
a power supply section for applying the voltage between the electrode substrate and the thin-film electrode.

18. A light emitting device, comprising:
an electron emitting device as set forth in claim 17; and
a light emitting element,
the light emitting device causing the light emitting element to emit light by causing the electron emitting device to emit electrons.

19. An image display device, comprising a light emitting device as set forth in claim 18.

20. An air blowing device, comprising:
an electron emitting device as set forth in claim 17,
the air blowing device causing the electron emitting device to emit electrons and blowing the electrons.

21. A cooling device, comprising:
an electron emitting device as set forth in claim 17,
the cooling device causing the electron emitting device to emit electrons so as to cool a material.

22. A charging device, comprising:
an electron emitting device as set forth in claim 17,
the charging device causing the electron emitting device to emit electrons so as to electrically charge a photoreceptor.

23. An image forming apparatus, comprising a charging device as set forth in claim 22.

24. An electron-beam curing device, comprising:
an electron emitting device as set forth in claim 17,
the electron-beam curing device causing the electron emitting device to emit electrons so as to cure a material.

* * * * *